US009822681B2

(12) United States Patent
Kikuchi et al.

(10) Patent No.: US 9,822,681 B2
(45) Date of Patent: *Nov. 21, 2017

(54) PLUGGED HONEYCOMB STRUCTURE AND MANUFACTURING METHOD OF THE SAME

(71) Applicant: NGK Insulators, Ltd., Nagoya (JP)

(72) Inventors: Yoshio Kikuchi, Nagoya (JP); Takashi Suzuki, Nagoya (JP); Masaki Ishikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 25 days.

This patent is subject to a terminal disclaimer.

(21) Appl. No.: 14/628,527

(22) Filed: Feb. 23, 2015

(65) Prior Publication Data

US 2015/0260067 A1    Sep. 17, 2015

(30) Foreign Application Priority Data

Mar. 14, 2014   (JP) .................. 2014-052421

(51) Int. Cl.
*B01D 50/00*    (2006.01)
*F01N 3/022*    (2006.01)
(Continued)

(52) U.S. Cl.
CPC ....... *F01N 3/0222* (2013.01); *B01D 46/0001* (2013.01); *B01D 46/2429* (2013.01);
(Continued)

(58) Field of Classification Search
CPC ........ F01N 3/0222; B01D 2239/04778; B01D 2046/2437; C04B 35/117
(Continued)

(56) References Cited

U.S. PATENT DOCUMENTS 4,483,944 A    11/1984  Day et al.
4,857,089 A *   8/1989  Kitagawa ........... B01D 53/9454
                                                         422/180
(Continued)

FOREIGN PATENT DOCUMENTS

EP    2 133 522 A1    12/2009
EP    2 158 956 A1     3/2010
EP    2 221 287 A1     8/2010
JP    S60-36364        2/1985
JP    2012-200649 A1  10/2012
JP    2012-201542 A1  10/2012
(Continued)

OTHER PUBLICATIONS

U.S. Appl. No. 14/621,586, filed Feb. 13, 2015, Yoshio Kikuchi.
Extended European Search Report (Application No. 15157952.1) dated Jun. 25, 2015.

*Primary Examiner* — Tom P Duong
(74) *Attorney, Agent, or Firm* — Burr & Brown, PLLC

(57) ABSTRACT

There is disclosed a plugged honeycomb structure. A plugged honeycomb structure includes a tubular honeycomb structure body having partition walls including a porous partition wall base material defining a plurality of cells which become through channels for a fluid and extend from a first end face to a second end face, and a porous trapping layer disposed on the surface of the partition wall base material; and plugging portions disposed in open ends of predetermined cells in the first end face and open ends of residual cells in the second end face, and the partition wall base material is constituted of a porous body including $\alpha$-$Al_2O_3$ as a main phase and further including aluminum titanate and glass.

18 Claims, 10 Drawing Sheets

(51) Int. Cl.
  *B01J 35/04*   (2006.01)
  *C04B 35/117*  (2006.01)
  *C04B 38/00*   (2006.01)
  *B01D 46/00*   (2006.01)
  *B01D 53/94*   (2006.01)
  *B01J 35/10*   (2006.01)
  *B01D 46/24*   (2006.01)

(52) U.S. Cl.
  CPC ......... *B01D 46/2474* (2013.01); *B01D 53/94* (2013.01); *B01J 35/04* (2013.01); *B01J 35/10* (2013.01); *C04B 35/117* (2013.01); *C04B 38/0006* (2013.01); *B01D 2046/2433* (2013.01); *B01D 2046/2437* (2013.01); *B01D 2258/01* (2013.01); *C04B 2201/30* (2013.01); *C04B 2235/3217* (2013.01); *C04B 2235/3232* (2013.01); *C04B 2235/3234* (2013.01); *C04B 2235/349* (2013.01); *C04B 2235/3472* (2013.01); *C04B 2235/3481* (2013.01); *C04B 2235/36* (2013.01); *C04B 2235/5436* (2013.01); *C04B 2235/5445* (2013.01); *C04B 2235/606* (2013.01); *C04B 2235/80* (2013.01); *C04B 2235/9607* (2013.01)

(58) Field of Classification Search
  USPC .................................................. 422/177, 180
  See application file for complete search history.

(56) References Cited

U.S. PATENT DOCUMENTS

| | | | | |
|---|---|---|---|---|
| 7,691,319 | B2* | 4/2010 | Inoue | C04B 33/1352 |
| | | | | 264/630 |
| 8,496,883 | B2* | 7/2013 | Mizutani | B01D 53/944 |
| | | | | 422/178 |
| 2008/0057268 | A1 | 3/2008 | Lu et al. | |
| 2008/0138569 | A1 | 6/2008 | Collier et al. | |
| 2009/0239031 | A1 | 9/2009 | Ichikawa et al. | |
| 2010/0135866 | A1 | 6/2010 | Mizuno et al. | |
| 2010/0310819 | A1 | 12/2010 | Suwabe et al. | |
| 2012/0058020 | A1* | 3/2012 | Takagi | B01D 53/944 |
| | | | | 422/178 |
| 2012/0070346 | A1* | 3/2012 | Mizutani | B01D 46/2474 |
| | | | | 422/178 |
| 2012/0240539 | A1 | 9/2012 | Kikuchi | |
| 2012/0240542 | A1 | 9/2012 | Kikuchi | |
| 2012/0301666 | A1 | 11/2012 | Collier et al. | |
| 2013/0214463 | A1 | 8/2013 | Suwabe et al. | |
| 2014/0186535 | A1 | 7/2014 | Kikuchi | |
| 2014/0202124 | A1 | 7/2014 | Kikuchi | |
| 2014/0252694 | A1 | 9/2014 | Kikuchi | |

FOREIGN PATENT DOCUMENTS

| | | |
|---|---|---|
| WO | 2008/136232 A1 | 11/2008 |
| WO | 2009/063997 A1 | 5/2009 |
| WO | 2011/125768 A1 | 10/2011 |

\* cited by examiner

PLUGGED HONEYCOMB STRUCTURE AND MANUFACTURING METHOD OF THE SAME

CROSS REFERENCE TO RELATED APPLICATION

The present application is an application based on JP2014-52421 filed with Japan Patent Office on Mar. 14, 2014, the entire contents of which are incorporated herein by reference.

BACKGROUND OF THE INVENTION

Field of the Invention

The present invention relates to a plugged honeycomb structure and a manufacturing method of the plugged honeycomb structure, and more particularly, it relates to a plugged honeycomb structure which can effectively inhibit a rise of a pressure loss generated due to deposition of particulate matter on partition walls while lowering the highest temperature during regeneration, when the plugged honeycomb structure is used as a filter such as a DPF, and a manufacturing method of the plugged honeycomb structure.

Description of Related Art

An exhaust gas discharged from an internal combustion engine such as a diesel engine, each type of combustion device or the like includes a large amount of particulate matter (hereinafter also referred to as "PM") mainly composed of soot. When this PM is discharged as it is into the air atmosphere, an environmental pollution is caused. Therefore, in an exhaust system for the exhaust gas, a particulate filter to trap the PM is mounted. An example of the particulate filter is a diesel particulate filter (DPF) for use in purification of the exhaust gas discharged from the diesel engine.

In such a DPF, there is used, for example, a honeycomb structure having porous partition walls defining a plurality of cells which become through channels for the exhaust gas. In this honeycomb structure, plugging portions to plug open ends of cells are disposed in the open ends of the predetermined cells in an end face on an outflow side of the fluid and the open ends of the residual cells in an end face on an inflow side of the fluid, and hence this honeycomb structure is utilized as a plugged honeycomb structure. Hereinafter, a particulate filter such as the DPF in which the plugged honeycomb structure is used will generically be referred to as "a honeycomb filter" sometimes.

As such a plugged honeycomb structure, for example, a plugged honeycomb structure has been suggested in which a porous trapping layer is further disposed on the surface of a partition wall base material of a honeycomb structure (e.g., see Patent Documents 1 and 2). Hereinafter, "the plugged honeycomb structure in which the trapping layer is disposed on the surface of the partition wall base material of the honeycomb structure" will be referred to as "the plugged honeycomb structure including the trapping layer" sometimes. Such a trapping layer has a larger specific surface area than the partition wall base material of the honeycomb structure.

In a honeycomb filter such as the DPF, a pressure loss gradually increases due to the PM deposited in the filter with an elapse of time, and hence the PM deposited in the honeycomb filter is periodically burnt and removed to regenerate the filter sometimes. For example, as a method of regenerating the DPF, a regenerating method is known in which a temperature of the exhaust gas discharged from the engine is raised to heat the DPF by use of the exhaust gas at a high temperature. An example of a method of raising the temperature of the exhaust gas is a method in which by post jetting to temporarily excessively jet a fuel in a latter half of an explosion stroke or in an exhaust stroke, the excessive fuel is burnt to raise the temperature of the exhaust gas.

[Patent Document 1] JP-A-2012-201542
[Patent Document 2] JP-A-2012-200649

SUMMARY OF THE INVENTION

Also in the abovementioned plugged honeycomb structure including the trapping layer, when the plugged honeycomb structure is used as a DPF, the DPF is regenerated by burning and removing a PM deposited in the DPF. In the plugged honeycomb structure including the trapping layer, when a temperature in the DPF excessively rises, the trapping layer having a large specific surface area, a catalyst loaded onto the trapping layer and ash or the like discharged from an engine react, and there is a possibility that a problem occurs that a performance of the trapping layer deteriorates.

To solve the abovementioned problem that the performance of the trapping layer deteriorates, there is contrived a method of enlarging a heat capacity of a partition wall base material of a honeycomb structure to inhibit a temperature rise in a DPF. Heretofore, as to a means for enlarging the heat capacity of the partition wall base material of a plugged honeycomb structure, limited means has only been suggested, and the means has been suggested mainly for the purpose of lowering a porosity of the partition wall base material. However, when the porosity of the partition wall base material is excessively lowered, an initial pressure loss of the plugged honeycomb structure (i.e., the DPF) disadvantageously enlarges.

SUMMARY OF THE INVENTION

Consequently, there is demanded a development of a plugged honeycomb structure in which a heat capacity of a partition wall base material of a honeycomb structure is enlarged while inhibiting an increase of an initial pressure loss of the plugged honeycomb structure as much as possible, so that a temperature rise in a DPF during regeneration can be inhibited.

Additionally, in a plugged honeycomb structure which does not include a trapping layer, when PM is deposited on partition walls, the pressure loss noticeably rises sometimes. In consequence, there is demanded a development of a plugged honeycomb structure in which the pressure loss hardly rises even when the PM is deposited on the partition walls, in a case where the plugged honeycomb structure is used as a filter such as the DPF.

The present invention has been developed in view of the abovementioned problems. An object of the present invention is to provide a plugged honeycomb structure which can effectively inhibit a rise of a pressure loss generated due to deposition of particulate matter on partition walls while lowering the highest temperature during regeneration, when the plugged honeycomb structure is used as a filter such as a DPF, and to provide a manufacturing method of the plugged honeycomb structure.

To achieve the abovementioned object, according to the present invention, there is provided a plugged honeycomb structure as follows.

According to a first aspect of the present invention, a plugged honeycomb structure including a pillar-shaped honeycomb structure body having partition walls including a porous partition wall base material defining a plurality of cells which become through channels for a fluid and extending from a first end face to a second end face is provided, and a porous trapping layer disposed on the surface of the partition wall base material; and plugging portions disposed in open ends of the predetermined cells in the first end face and open ends of the residual cells in the second end face, wherein the partition wall base material is constituted of a porous body including $\alpha$-$Al_2O_3$ as a main phase and further including aluminum titanate and glass.

According to a second aspect of the present invention, the plugged honeycomb structure according to the above first aspect is provided, wherein a mass ratio between the $\alpha$-$Al_2O_3$ and the aluminum titanate in the porous body constituting the partition wall base material is from 60/40 to 90/10.

According to a third aspect of the present invention, the plugged honeycomb structure according to the above first or second aspects is provided, wherein the porous body constituting the partition wall base material includes 5 to 15 mass % of the glass to 100 mass % of a total of the $\alpha$-$Al_2O_3$, the aluminum titanate and the glass.

According to a fourth aspect of the present invention, the plugged honeycomb structure according to any one of the above first to third aspect is provided, wherein a porosity of the partition wall base material is from 20 to 50%.

According to a fifth aspect of the present invention, the plugged honeycomb structure according to any one of the above first to fourth aspects is provided, wherein an average pore diameter of the partition wall base material is from 5 to 50 μm.

According to a sixth aspect of the present invention, the plugged honeycomb structure according to any one of the above first to fifth aspects is provided, wherein a heat capacity of a material constituting the partition wall base material at 600° C. is from 4.25 to 4.50 J/K/cm$^3$.

According to a seventh aspect of the present invention, the plugged honeycomb structure according to any one of the above first to sixth aspects is provided, wherein an average thermal expansion coefficient of the partition walls at 40 to 800° C. is from 2.5 to 6.0 ppm/K.

According to an eighth aspect of the present invention, the plugged honeycomb structure according to any one of the above first to seventh aspects is provided, wherein the trapping layer includes at least one selected from a group consisting of SiC, silica, mullite, spinel, and alumina.

According to a ninth aspect of the present invention, the plugged honeycomb structure according to any one of the above first to eighth aspects is provided, wherein a porosity of the trapping layer is from 50 to 80%.

According to a tenth aspect of the present invention, the plugged honeycomb structure according to any one of the above first to ninth aspects is provided, wherein an average pore diameter of the trapping layer is from 1 to 10 μm.

According to an eleventh aspect of the present invention, the plugged honeycomb structure according to any one of the above first to tenth aspects is provided, wherein a membrane thickness of the trapping layer is from 5 to 50 μm.

According to a twelfth aspect of the present invention, the plugged honeycomb structure according to any one of the above first to eleventh aspects is provided, wherein a part of the trapping layer penetrates into pores formed in the partition wall base material, and a thickness of the trapping layer penetrating into the pores formed in the partition wall base material is from 0.1 to 20 μm.

According to a thirteenth aspect of the present invention, the plugged honeycomb structure according to any one of the above first to twelfth aspects is provided, wherein when the first end face of the honeycomb structure body is an end face on an inlet side of the fluid passing through the cells and the second end face of the honeycomb structure body is an end face on an outlet side of the fluid passing through the cells, the trapping layer is disposed in a region of 20 to 80% of a longitudinal direction from the second end face in the longitudinal direction from the first end face toward the second end face of the honeycomb structure body.

According to a fourteenth aspect of the present invention, the plugged honeycomb structure according to any one of the above first to thirteenth aspects is provided, wherein a thickness of a portion of the trapping layer which is positioned in a corner portion of each of the cells is from one to three times as large as a thickness of a portion of the trapping layer which is positioned in a central portion of a side of the cell.

According to a fifteenth aspect of the present invention, the plugged honeycomb structure according to any one of the above first to fourteenth aspects is provided, wherein an exhaust gas purifying catalyst is loaded onto at least one of each surface of the partition walls of the honeycomb structure body and each pore of the partition walls.

According to a sixteenth aspect of the present invention, a manufacturing method of the plugged honeycomb structure according to any one of the above first to fifteenth aspects is provided, including a step of applying slurry including a trapping layer forming ceramic raw material and combustible fine particles dispersed in water to the surface of the partition wall base material in the honeycomb structure body prior to firing.

According to a seventeenth aspect of the present invention manufacturing method of the plugged honeycomb structure according to the above sixteenth aspect is provided, wherein an average particle diameter of the combustible fine particles is from 0.05 to 0.5 μm.

According to an eighteenth aspect of the present invention, the manufacturing method of the plugged honeycomb structure according to the above sixteenth or seventeenth aspect is provided, wherein the combustible fine particles are made of carbon black.

According to a nineteenth aspect of the present invention, the manufacturing method of the plugged honeycomb structure according to any one of the above sixteenth to eighteenth aspects is provided, wherein a volume ratio of the trapping layer forming ceramic raw material to the combustible fine particles is from 20/80 to 80/20.

A plugged honeycomb structure of the present invention includes a pillar-shaped honeycomb structure body and plugging portions. The honeycomb structure body has partition walls including a porous partition wall base material and a porous trapping layer disposed on the surface of the partition wall base material. Furthermore, in the plugged honeycomb structure of the present invention, the partition wall base material of the honeycomb structure body is constituted of a porous body including $\alpha$-$Al_2O_3$ as a main phase and further including aluminum titanate and glass. In the porous body constituting the partition wall base material, a material constituting the porous body has a higher heat capacity per unit volume of a material constituting the porous body as compared with a material of a partition wall base material for use in a heretofore known plugged honeycomb structure. In the plugged honeycomb structure of the present invention, the heat capacity per unit volume of the material constituting the porous body is high, and hence a temperature rise can be inhibited during use at high temperatures. Consequently, in the plugged honeycomb structure in which the partition walls are constituted by using the partition wall base material and the trapping layer, there is produced a remarkable effect that it is possible to effectively inhibit deterioration of a performance of the trapping layer accompanying an excessive temperature rise. Additionally, in the plugged honeycomb structure of the present invention, the heat capacity per unit volume of the material constituting the porous body is high, and hence there is produced a remarkable effect that the plugged honeycomb structure is excellent in thermal shock resistance. Therefore, when the plugged honeycomb structure of the present invention is used as a DPF, it is possible to inhibit a temperature rise during regeneration of the DPF. Furthermore, when the plugged honeycomb structure of the present invention is used as a filter such as the DPF, it is possible to effectively inhibit a rise of a pressure loss generated due to deposition of PM on the partition walls. In particular, the trapping layer can effectively reduce the pressure loss, when the PM is deposited thereon. Therefore, when the partition wall base material having a low porosity and the trapping layer are combined and used, it is possible to effectively inhibit the rise of the pressure loss generated due to the deposition of the PM on the partition walls, while lowering the highest temperature during the regeneration. In addition, according to a manufacturing method of the plugged honeycomb structure of the present invention, the plugged honeycomb structure of the present invention can easily be manufactured.

DETAILED DESCRIPTION OF THE INVENTION

Figure 1:
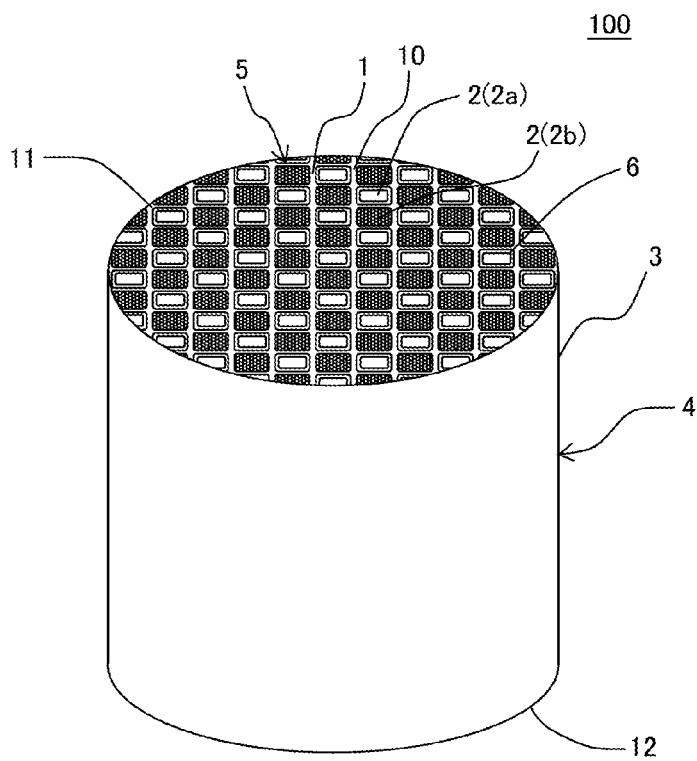
FIG. 1 is a schematic perspective view of one embodiment of a plugged honeycomb structure of the present invention seen from an inflow end face side.

Next, a mode for carrying out the present invention will be described in detail with reference to the drawings. It should be understood that the present invention is not limited to the following embodiments and that changes, improvements and the like of design are suitably added on the basis of ordinary knowledge of a person skilled in the art without departing from the gist of the present invention.

(1) Plugged Honeycomb Structure

One embodiment of a plugged honeycomb structure of the present invention is a plugged honeycomb structure 100 including a pillar-shaped honeycomb structure body 4 and plugging portions 5 disposed in open ends of cells 2 as shown in FIG. 1 to FIG. 5. The honeycomb structure body 4 is a pillar-shaped body having partition walls 10 including a porous partition wall base material 1 defining the plurality of cells 2 which become through channels for a fluid and extend from a first end face 11 to a second end face 12, and a porous trapping layer 6 disposed on the surface of the partition wall base material 1. The trapping layer 6 is a porous layer disposed on the surface of the partition wall base material 1 of the honeycomb structure body 4. The plugging portion 5 is disposed in one of the open ends of each of the plurality of cells 2 to plug the open ends of the cells 2. In FIG. 1 to FIG. 5, the plugging portions 5 are disposed in the open ends of predetermined cells 2b (hereinafter referred to simply as "the cells 2b") in the first end face 11 and the open ends of the residual cells 2a (hereinafter referred to simply as "the cells 2a") in the second end face 12. The plugged honeycomb structure 100 having such a constitution is usable as a particulate filter to purify an exhaust gas discharged from an internal combustion engine or each type of combustion device. The plugged honeycomb structure 100 shown in FIG. 1 to FIG. 5 further has a circumferential wall 3 positioned at an outermost circumference of the honeycomb structure body 4.

Figure 2:
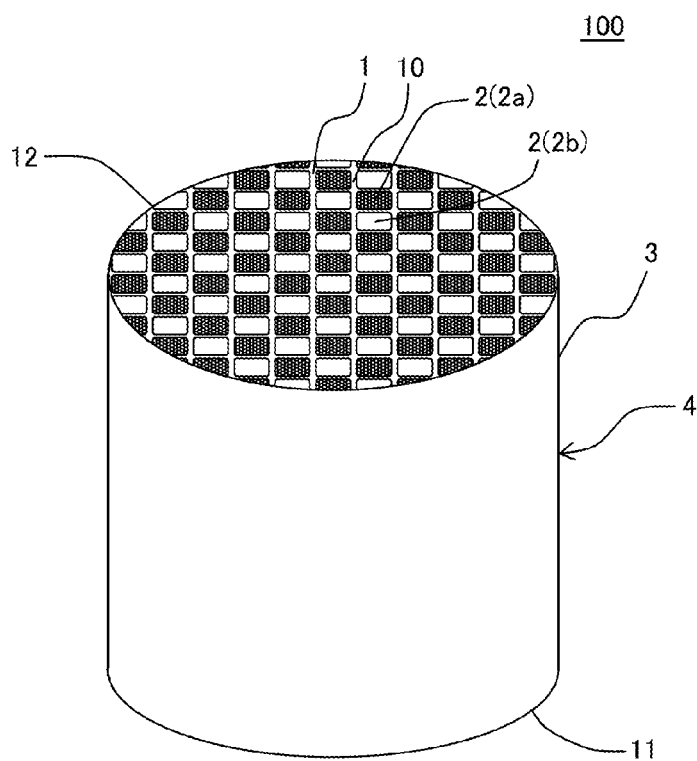
FIG. 2 is a schematic perspective view of the plugged honeycomb structure shown in FIG. 1 and seen from an outflow end face side.
Figure 3:
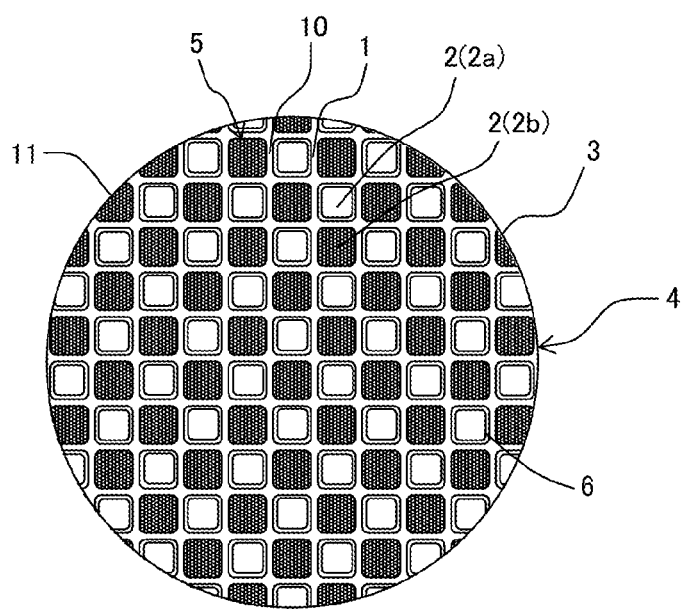
FIG. 3 is a schematic plan view of the plugged honeycomb structure shown in FIG. 1 and seen from the inflow end face side.
Figure 4:
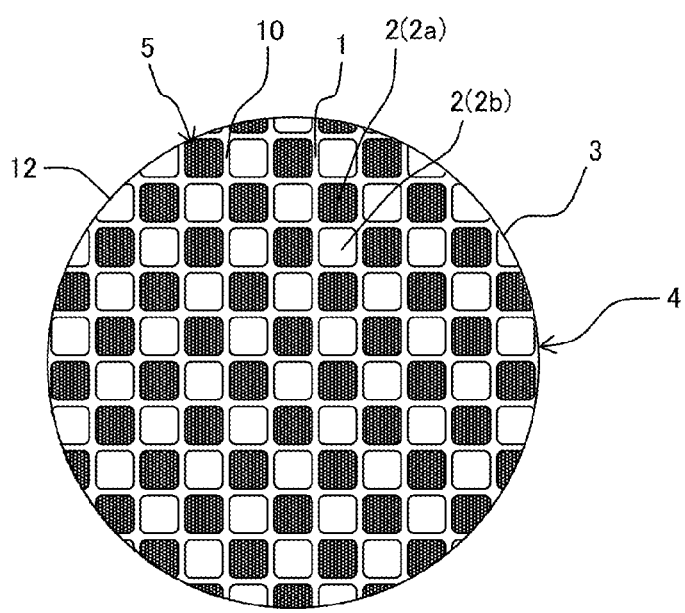
FIG. 4 is a schematic plan view of the plugged honeycomb structure shown in FIG. 1 and seen from the outflow end face side.
Figure 5:
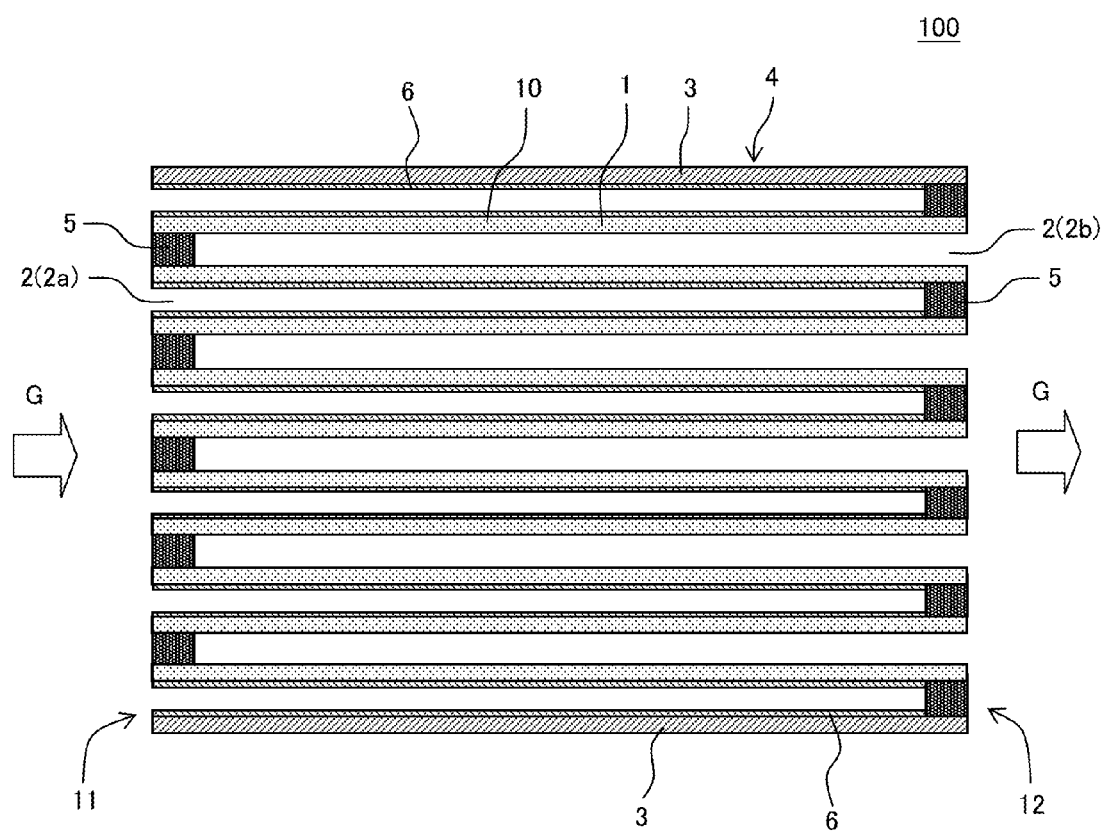
FIG. 5 is a schematic sectional view showing a cross section of the plugged honeycomb structure shown in FIG. 1 which is parallel to a cell extending direction.

Here, FIG. 1 is a schematic perspective view of one embodiment of the plugged honeycomb structure of the present invention seen from an inflow end face side. FIG. 2 is a schematic perspective view of the plugged honeycomb structure shown in FIG. 1 and seen from an outflow end face side. FIG. 3 is a schematic plan view of the plugged honeycomb structure shown in FIG. 1 and seen from the inflow end face side. FIG. 4 is a schematic plan view of the plugged honeycomb structure shown in FIG. 1 and seen from the outflow end face side. FIG. 5 is a schematic sectional view showing a cross section of the plugged honeycomb structure shown in FIG. 1 which is parallel to a cell extending direction. In FIG. 5, reference symbol G shows the fluid (e.g., the exhaust gas) passing through the cells, and the fluid moves in a direction of arrows denoted with the reference symbol G.

In the plugged honeycomb structure 100, the partition wall base material 1 is constituted of a porous body including $\alpha$-$Al_2O_3$ as a main phase and further including aluminum titanate and glass. Such a porous body has a higher heat capacity per unit volume of a material constituting the porous body as compared with a material of a partition wall base material for use in a heretofore known plugged honeycomb structure. In the plugged honeycomb structure 100, the heat capacity per unit volume of the material constituting the porous body is high, and hence it is possible to inhibit a temperature rise during the use at high temperatures. Therefore, in the plugged honeycomb structure 100 in which the partition walls 10 are constituted by using the partition wall base material 1 and the trapping layer 6, there is produced a remarkable effect that it is possible to effectively inhibit deterioration of a performance of the trapping layer 6 accompanying an excessive temperature rise. Furthermore, in the plugged honeycomb structure 100 of the present embodiment, the heat capacity per unit volume of the material constituting the porous body is high, and hence there is also produced a remarkable effect that the plugged honeycomb structure is excellent in thermal shock resistance. Therefore, when the plugged honeycomb structure 100 of the present embodiment is used as a DPF, it is possible to inhibit a temperature rise during regeneration of the DPF and, for example, even when the number of times to regenerate the DPF is decreased, damages due to thermal shock are not easily generated.

Furthermore, when the plugged honeycomb structure 100 is used as a filter such as the DPF, it is possible to effectively inhibit a rise of a pressure loss generated due to deposition of a PM (particulate matter) on the partition walls 10.

Here, "the heat capacity per unit volume of the material" means a heat capacity measured in a dense material in which any pores or the like are not formed. For example, in the porous body, the pores formed in the porous body are not taken into consideration, and hence the heat capacity is a heat capacity of the material itself constituting the porous body. Hereinafter, in the present description, the heat capacity in which the pores formed in the porous body are taken into consideration will be described as "the heat capacity per unit volume of the porous body", and distinguished from the abovementioned "heat capacity per unit volume of the material". "The heat capacity per unit volume of the material" is referred to simply as "the heat capacity of the material" sometimes. "The heat capacity per unit volume of the porous body" is referred to simply as "the heat capacity of the porous body" sometimes. In the present description, "the heat capacity" is a heat capacity at 600° C. unless otherwise specifically noted. In the present description, a value of each of "the heat capacity" and "the heat capacity per unit volume" is indicated as the heat capacity (J/K/cm$^3$) per 1 cm$^3$ unless otherwise specifically noted. In addition, "the material constituting the porous body" is referred to also as "the material constituting the partition wall base material" sometimes. Additionally, in the present description, "the heat capacity of the partition wall base material" means "the heat capacity of the porous body constituting the partition wall base material".

"The main phase" in the porous body constituting the partition wall base material 1 is a substance having a mass ratio of 40 mass % or more. On the other hand, a substance which has a mass ratio smaller than 20 mass %, does not correspond to the abovementioned main phase and is identified by X-ray diffraction method is referred to "a sub phase" sometimes. In the plugged honeycomb structure of the present embodiment, the glass and the like included in the porous body correspond to the sub phase. It is to be noted that "the main phase" in the porous body is not limited to one type. Furthermore, when two types of substances satisfying the above conditions are present, both the two types of substances belong to "the main phase". In the present description, "the substance" means a substance which chemically has a constant composition and cannot be divided into two or more types of substances by a physical operation.

Furthermore, in the present description, "aluminum titanate" is indicated as "$Al_2TiO_5$" sometimes. Additionally, in the present description, a case where "$Al_2TiO_5$" or "$\alpha$-$Al_2O_3$" is described also includes a case where other components are solid-dissolved besides the components described in the above chemical formula. Examples of the other components to be solid-dissolved include Fe, Mg and Si. In addition, characteristics of the partition wall base material described as follows are measured only from the partition wall base material in which a portion where the trapping layer is disposed is ground and then the trapping layer is removed from the partition walls including the partition wall base material and the trapping layer. Furthermore, various characteristics of the partition wall base material described as follows are measured only from the partition wall base material as an object in which the portion where the trapping layer is disposed is ground and then the trapping layer is removed from the partition walls including the partition wall base material and the trapping layer, unless otherwise specifically noted.

A mass ratio ($\alpha$-$Al_2O_3$/$Al_2TiO_5$) between the $\alpha$-$Al_2O_3$ and aluminum titanate in the porous body constituting the partition wall base material is preferably from 60/40 to 90/10, further preferably from 70/30 to 90/10, and especially preferably from 80/20 to 90/10. For example, when a ratio of aluminum titanate included in the porous body is relatively excessively large (i.e., the ratio of $\alpha$-$Al_2O_3$ is relatively excessively small), the heat capacity per unit volume of the material constituting the porous body does not sufficiently improve sometimes. On the other hand, when the ratio of aluminum titanate included in the porous body is relatively excessively small (i.e., the ratio of $\alpha$-$Al_2O_3$ is relatively excessively large), an average thermal expansion coefficient of the porous body at 40 to 800° C. disadvantageously enlarges. The average thermal expansion coefficient of the porous body can be obtained by measuring the average thermal expansion coefficient at 40 to 800° C. with a differential detection type of thermal dilatometer.

The mass ratio between $\alpha$-$Al_2O_3$ and aluminum titanate in the porous body constituting the partition wall base material can be obtained by the following method. First, a test piece to obtain the mass ratio is prepared by using the porous body constituting the partition wall base material of the plugged honeycomb structure. This test piece can be prepared by cutting out the test piece having a predetermined size only from the partition wall base material (i.e., the porous body) in which the portion where the trapping layer is disposed is ground and then the trapping layer is removed from the partition walls including the partition wall base material and the trapping layer. Next, the obtained test piece is pulverized into the form of powder. The test piece is prepared in the form of the powder and then a mass thereof is beforehand measured. The obtained powder is thrown into a liquid including hydrofluoric acid. The liquid including hydrofluoric acid is obtained by mixing hydrofluoric acid (a content ratio of 46%), sulfuric acid (a content ratio of 97%), hydrochloric acid (a content ratio of 36%) and distilled water at a volume ratio of 10:2:3:25. The powder is thrown into the liquid including hydrofluoric acid, and then the liquid is retained at 0° C. for 30 minutes to dissolve the glass in the powder. Afterward, the respective amounts of solute components in the liquid are measured, and the respective solute components are subjected to oxide conversion to obtain a total sum thereof as a glass amount. For example, Al is converted into $Al_2O_3$ as an oxide. In this way, the mass ratio of the glass to be included in the test piece can be obtained. Afterward, an amount of $\alpha\text{-}Al_2O_3$ in a residue is quantitatively determined by an internal standard method of X-ray diffraction (XRD). Furthermore, the balance in the residue is $Al_2TiO_5$. The above mass ratio can be obtained from the masses of $\alpha\text{-}Al_2O_3$ and $Al_2TiO_5$ which are measured as described above. Here, the "residue" means the powder after the glass in the powder is dissolved. Additionally, "the balance in the residue" means an amount obtained by subtracting the amount of $\alpha\text{-}Al_2O_3$ from the residue. In addition, "the internal standard method of the X-ray diffraction (XRD)" is a method in which an internal standard substance and a sample are mixed at a predetermined ratio, and a calibration curve is prepared by using a standard sample having a known concentration and analyzed by using a fact that a linear relation is obtained between a substance concentration and a diffraction intensity ratio.

The porous body constituting the partition wall base material includes preferably 5 to 15 mass %, further preferably 5 to 12 mass % and especially preferably 7 to 12 mass % of the glass to 100 mass % in total of $\alpha\text{-}Al_2O_3$, aluminum titanate and glass. When the content ratio of the glass is smaller than 5 mass % to the total of 100 mass % of $\alpha\text{-}Al_2O_3$, aluminum titanate and glass, a porosity of the partition wall base material (i.e., the porous body) heightens, and strength of the plugged honeycomb structure lowers sometimes. When the content ratio of the glass is in excess of 15 mass % to the total of 100 mass % of $\alpha\text{-}Al_2O_3$, aluminum titanate and glass, the heat capacity per unit volume of the material constituting the porous body does not sufficiently improve sometimes. The content ratio of the glass in the porous body can be obtained from a mass of the glass dissolved in an acid solution when the abovementioned mass ratios of $\alpha\text{-}Al_2O_3$ and aluminum titanate are obtained. It is to be noted that in the present description, the glass is an oxide which does not have a specific diffraction pattern in the XRD. Hereinafter, in the present description, when "the porous body" is simply mentioned, "the porous body constituting the partition wall base material" is meant, unless otherwise specifically noted.

Figure 7:
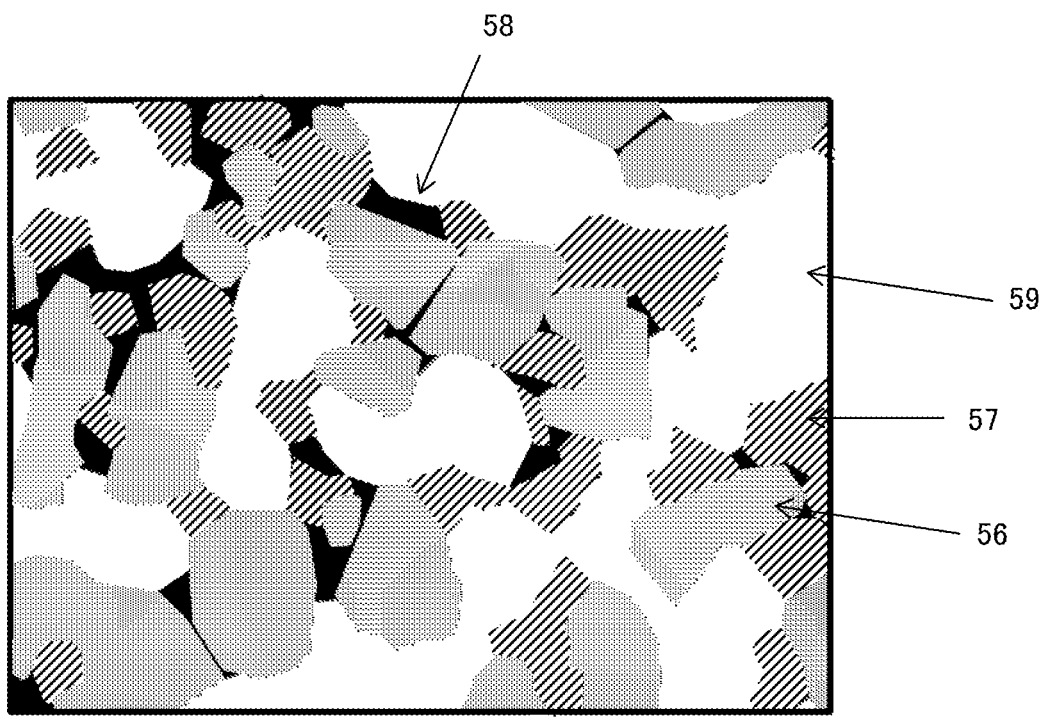
FIG. 7 is a schematic view showing one example of an SEM photograph of a porous body constituting a partition wall base material in the one embodiment of the plugged honeycomb structure of the present invention.

For example, FIG. 7 shows an SEM image (an SEM photograph) in which the porous body constituting the partition wall base material is observed. FIG. 7 is a schematic view showing one example of the SEM photograph of the porous body constituting the partition wall base material in the one embodiment of the plugged honeycomb structure of the present invention. The SEM photograph is a photograph imaged by a scanning electron microscope. As shown in FIG. 7, the porous body includes "$\alpha\text{-}Al_2O_3$" denoted with reference numeral 56, "aluminum titanate" denoted with reference numeral 57 and "glass" denoted with reference numeral 58. Furthermore, in the porous body, a plurality of "pores" denoted with reference numeral 59 are formed.

A porosity of the partition wall base material (i.e., the porous body constituting the partition wall base material) is preferably from 20 to 50%, further preferably from 20 to 45%, and especially preferably from 25 to 40%. The lower the porosity of the partition wall base material is, the more the highest temperature during the regeneration in the use as the filter can be lowered. On the other hand, however, there is a tendency that when the porosity of the partition wall base material lowers, the pressure loss during the deposition of the PM on the partition wall heightens. The trapping layer can effectively lower the pressure loss when the PM is deposited. Therefore, when the partition wall base material having a low porosity and the trapping layer are combined and used, it is possible to effectively inhibit a rise of the pressure loss generated due to the deposition of the PM on the partition walls while lowering the highest temperature during the regeneration. Particularly, in the abovementioned preferable numeric range of the porosity of the partition wall base material, the combination of the partition wall base material of the low porosity and the trapping layer is a more preferable configuration. The porosity of the partition wall base material can be measured in conformity with JIS R 1634 by Archimedes method.

An average pore diameter of the partition wall base material (i.e., the porous body constituting the partition wall base material) is preferably from 5 to 50 μm, further preferably from 8 to 30 μm, and especially preferably from 10 to 25 μm. When the average pore diameter of the partition wall base material is increased, an initial pressure loss can be lowered. However, the PM included in the exhaust gas passes through the pores of the partition wall base material to disadvantageously leak outside from the plugged honeycomb structure sometimes. The trapping layer can inhibit the leakage of the PM from the partition walls, and hence a combination of the partition wall base material having a large average pore diameter and the trapping layer is suitable. However, when the trapping layer is formed to the partition wall base material (i.e., the porous body constituting the partition wall base material) prepared by firing a forming raw material, the trapping layer penetrates into the pores of the partition wall base material, and the initial pressure loss of the plugged honeycomb structure disadvantageously heightens sometimes. On the other hand, when the trapping layer is formed in an unfired body in which any pores are not formed (i.e., a precursor of the partition wall base material), the trapping layer is inhibited from penetrating into the pores, so that it is possible to effectively inhibit the rise of the pressure loss. Therefore, the partition wall base material having a large average pore diameter is especially suitably combined with a method of forming the trapping layer in the unfired body. The average pore diameter of the partition wall base material can be measured in conformity with JIS R 1655 by mercury porosimetry.

A true density of the material constituting the partition wall base material (i.e., the porous body) is preferably from 3.65 to 3.85 g/cm$^3$, further preferably from 3.70 to 3.85 g/cm$^3$, and especially preferably from 3.75 to 3.85 g/cm$^3$. When the true density of the material constituting the partition wall base material is in the abovementioned numeric range, the porous body suitably contains less glass. For example, when the true density of the material constituting the partition wall base material is smaller than 3.65 g/cm$^3$, the heat capacity is disadvantageously excessively small sometimes, and when the true density is in excess of 3.85 g/cm$^3$, the strength disadvantageously excessively lowers or the average thermal expansion coefficient disadvantageously excessively enlarges sometimes. The true density of the material constituting the partition wall base material can be measured in conformity with JIS R 1634 by the Archimedes method.

The heat capacity of the material constituting the partition wall base material (i.e., the porous body) at 600° C. is preferably from 4.25 to 4.50 J/K/cm$^3$, further preferably from 4.30 to 4.50 J/K/cm$^3$, and especially preferably from 4.35 to 4.50 J/K/cm$^3$. The larger the heat capacity of the material constituting the partition wall base material is, the more the highest temperature during the regeneration of the filter can be lowered. As a result, it is possible to effectively inhibit the trapping layer from reacting with another substance (e.g., a catalyst loaded onto the trapping layer or ash discharged from the engine) and changing.

The heat capacity of the material constituting the partition wall base material (i.e., the porous body) at 600° C. can be obtained by the following method. First, a heat capacity (J/K/g) per unit mass of the material constituting the partition wall base material at 600° C. is measured by using an adiabatic type specific heat measurement system manufactured by ULVAC-RICO, Inc. The obtained heat capacity (J/K/g) per unit mass is multiplied by the true density (g/cm$^3$) of the material constituting the partition wall base material which is measured at room temperature by the Archimedes method, to calculate the heat capacity (J/K/cm$^3$) per unit volume of the material constituting the partition wall base material. To measure the heat capacity, a sample having a predetermined size is cut out from the porous body constituting the partition wall base material so that the heat capacity can be measured by using the sample.

The average thermal expansion coefficient of the partition walls at 40 to 800° C. is preferably from 2.5 to 6.0 ppm/K, further preferably from 3.0 to 5.0 ppm/K, and especially preferably from 4.0 to 5.0 ppm/K. When the average thermal expansion coefficient of the partition walls at 40 to 800° C. is in the above numeric range, the plugged honeycomb structure becomes excellent in thermal shock resistance. "The average thermal expansion coefficient of the partition walls" is the average thermal expansion coefficient measured from a constitutional element (i.e., the partition walls) including the partition wall base material and the trapping layer disposed on the surface of the partition wall base material. The average thermal expansion coefficient of the partition walls can be obtained by measuring the average thermal expansion coefficient at 40 to 800° C. with the differential detection type of thermal dilatometer.

Figure 6:
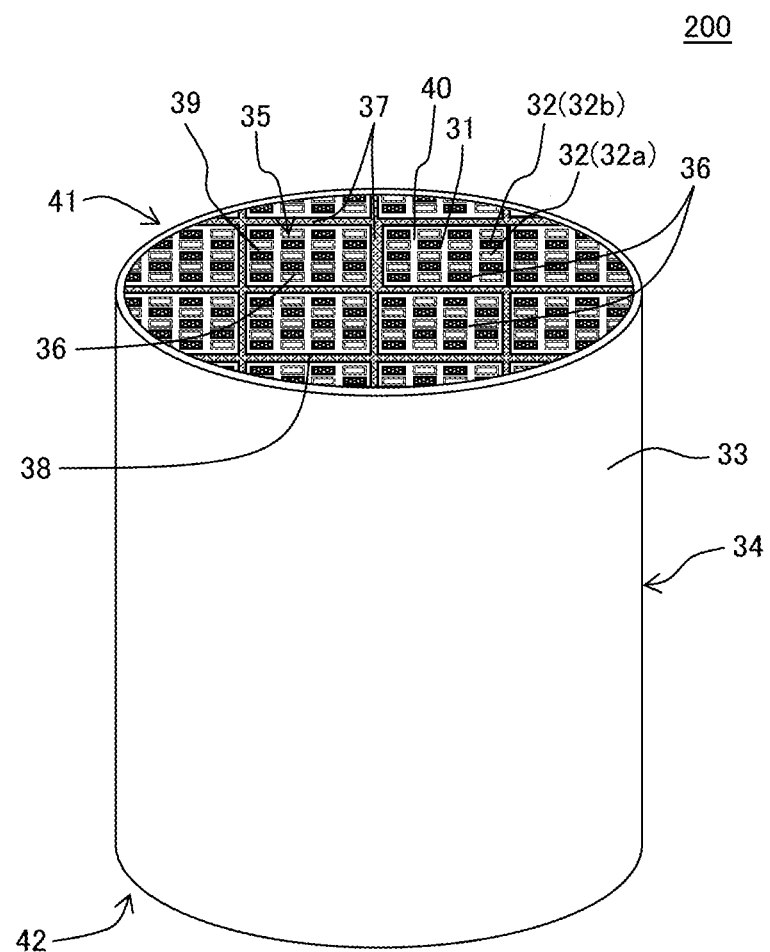
FIG. 6 is a schematic perspective view of another embodiment of the plugged honeycomb structure of the present invention seen from an inflow end face side.

In addition, the honeycomb structure body of the plugged honeycomb structure may be a segmented structure having a plurality of pillar-shaped honeycomb segments each of which has the partition walls including the partition wall base material and the trapping layer and in which the plurality of honeycomb segments are bonded in a state where the honeycomb segments are disposed adjacent to one another so that side surfaces of the honeycomb segments face one another. An example of the plugged honeycomb structure including the honeycomb structure body of the segmented structure is such a plugged honeycomb structure 200 as shown in FIG. 6. The plugged honeycomb structure 200 shown in FIG. 6 includes a honeycomb structure body 34 in which a plurality of honeycomb segments 39 are bonded by a bonding layer 37 in a state where the honeycomb segments are disposed adjacent to one another so that side surfaces of the honeycomb segments face one another. Each of the honeycomb segments 39 has a partition wall base material 31, partition walls 40 including a trapping layer 36 disposed on the surface of the partition wall base material 31, and an outer wall 38 disposed to surround the partition walls 40. The partition wall base material 31 is a porous material defining a plurality of cells 32 (cells 32a and cells 32b) which extend from a first end face 41 to a second end face 42 and become through channels for a fluid. The bonding layer 37 bonds the outer walls 38 of the honeycomb segments 39 disposed adjacent to one another. The bonding layer 37 may have a function of a buffer material to buffer a heat stress generated in the honeycomb structure body 34. In the plugged honeycomb structure 200 shown in FIG. 6, a circumferential wall 33 is disposed at an outermost circumference of a bonded body in which the plurality of honeycomb segments 39 are bonded.

In the honeycomb structure body of the segmented structure, the partition wall base material of at least one of the plurality of honeycomb segments is preferably constituted of a porous body including α-Al$_2$O$_3$ as a main phase and further including aluminum titanate and glass. In the honeycomb structure body of the segmented structure, the partition wall base materials of all the honeycomb segments may be constituted of the porous body including α-Al$_2$O$_3$ as the main phase and further including aluminum titanate and glass. As to the bonding layer, a bonding layer having a constitution similar to a bonding layer in a honeycomb structure body of a heretofore known segmented structure is usable.

The plugged honeycomb structure 200 shown in FIG. 6 may be prepared by obtaining the bonded body in which the plurality of honeycomb segments 39 are bonded and processing a circumferential portion of the obtained bonded body by grinding or the like. The circumferential portion of the bonded body is processed, so that a shape of a cross section of the bonded body which is perpendicular to an extending direction of the cells 32 can be a desirable shape such as a circular shape. The circumferential portion of the bonded body is processed, and then the circumferential wall 33 may be disposed by applying a ceramic material to the outermost circumference. FIG. 6 is a schematic perspective view of another embodiment of the plugged honeycomb structure of the present invention seen from an inflow end face side. In FIG. 6, reference numeral 35 is "a plugging portion" disposed in an open end of the cell 32. Even in such a plugged honeycomb structure of the so-called segmented structure, an operation effect similar to that of a so-called monolithic plugged honeycomb structure shown in FIG. 1 to FIG. 5 can be obtained.

There is not any special restriction on a thickness of the partition wall base material of the honeycomb structure body, and the thickness is preferably from 100 to 500 μm, further preferably from 150 to 400 μm, and especially preferably from 150 to 300 μm. When the thickness of the partition wall base material is in such a range, a rise of the pressure loss can be inhibited while keeping the strength of the partition wall base material of the plugged honeycomb structure.

There is not any special restriction on a cell density of the honeycomb structure body, and the cell density is preferably from 15 to 100 cells/cm$^2$, further preferably from 30 to 65 cells/cm$^2$, and especially preferably from 30 to 50 cells/cm$^2$. When the cell density is in such a range and when the plugged honeycomb structure is used as the DPF or the like, a trapping efficiency can be improved while inhibiting the pressure loss.

There is not any special restriction on a shape of each cell formed in the honeycomb structure body. Here, "the cell shape" is the shape of the cells in a cross section of the honeycomb structure body which is perpendicular to the cell extending direction. Examples of the cell shape include a quadrangular shape, a hexagonal shape, an octagonal shape, and any combination of these shapes.

There is not any special restriction on a shape of the honeycomb structure body, and examples of the shape include a pillar shape (a round pillar shape) in which a bottom surface is circular, a pillar shape in which a bottom surface is oval, and a pillar shape in which a bottom surface has a polygonal shape (a quadrangular shape, a pentangular shape, a hexagonal shape, a heptagonal shape, an octagonal shape or the like).

A length of the honeycomb structure body from the first end face to the second end face and a size of the cross section of the honeycomb structure body which is perpendicular to the cell extending direction may suitably be selected so that an optimum purification performance can be obtained when the plugged honeycomb structure of the present embodiment is used as an exhaust gas purifying filter. For example, the length of the honeycomb structure body from the first end face to the second end face is preferably from 100 to 500 mm and further preferably from 100 to 300 mm. An area of the cross section of the honeycomb structure body which is perpendicular to the cell extending direction is preferably from 7000 to 70000 mm$^2$ and further preferably from 7000 to 30000 mm$^2$.

As to the trapping layer, a constitution of the trapping layer for use in the heretofore known plugged honeycomb structure can be employed. However, in the plugged honeycomb structure of the present embodiment, the trapping layer preferably includes at least one selected from a group consisting of SiC, silica, mullite, spinel, and alumina. The material constituting the trapping layer can be analyzed by the following method. First, there are prepared a first powder obtained by pulverizing the partition walls, and a second powder obtained by grinding the portion of the trapping layer from the partition walls and pulverizing the porous body only including the partition wall base material. Each of the first powder and the second powder is qualitatively determined by using X-ray diffraction (XRD) and quantitatively determined by an internal standard method of the X-ray diffraction (XRD). The qualitative result and quantitative result of the first powder are compared with the qualitative result and quantitative result of the second powder, so that the material constituting the trapping layer can be analyzed.

A porosity of the trapping layer is preferably from 50 to 80%, further preferably from 60 to 80%, and especially preferably from 65 to 80%. When the porosity of the trapping layer is smaller than 50%, the pressure loss of the plugged honeycomb structure heightens sometimes. On the other hand, when the porosity of the trapping layer is in excess of 80% and when the plugged honeycomb structure is used as the filter, the PM included in the exhaust gas passes through the pores of the partition walls to disadvantageously leak outside from the plugged honeycomb structure sometimes. The porosity of the trapping layer can be measured by the following method. First, the honeycomb structure body in which the trapping layer is disposed on the surface of the partition wall base material is buried in a resin. Next, the honeycomb structure body buried in this resin is cut vertically to the cell extending direction. A cut surface of the cut honeycomb structure body is polished and the trapping layer in the cut surface is observed with a scanning electron microscope (SEM). An observed SEM image (5000 magnification) is used to measure a ratio of the pores formed in the trapping layer by using image processing software (Image-Pro Plus 7.0 (trade name) manufactured by Nihon Visual Science, Inc.). The "ratio of the pores" measured as described above is the porosity of the trapping layer.

Figure 8:
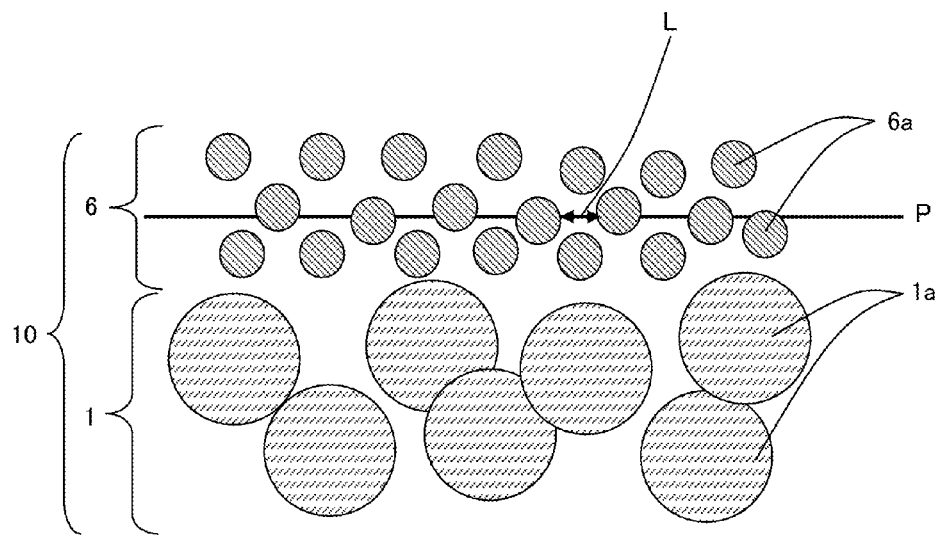
FIG. 8 is a schematic view to explain a measuring method of an average pore diameter of a trapping layer.

An average pore diameter of the trapping layer is preferably from 1 to 10 μm, further preferably from 1 to 8 μm, and especially preferably from 1 to 5 μm. When the average pore diameter of the trapping layer is smaller than 1 μm, the initial pressure loss of the plugged honeycomb structure heightens sometimes. On the other hand, when the average pore diameter of the trapping layer is in excess of 10 μm, the PM included in the exhaust gas passes through the pores of the partition walls to leak outside from the plugged honeycomb structure in a case where the plugged honeycomb structure is used as the filter. The average pore diameter of the trapping layer can be measured by the following method. First, similarly to the measuring method of the porosity of the trapping layer, the trapping layer in the cut surface is observed with a scanning electron microscope (SEM). Here, FIG. 8 is a schematic view to explain the measuring method of the average pore diameter of the trapping layer. FIG. 8 is an enlarged schematic view showing the enlarged trapping layer and partition wall base material in the cut surface of the honeycomb structure body obtained by cutting the honeycomb structure body vertically to the cell extending direction. In FIG. 8, reference numeral 1 is the partition wall base material and reference numerals 1a are particles constituting the partition wall base material 1 (the particles 1a constituting the partition wall base material 1). In FIG. 8, reference numeral 6 is the trapping layer and reference numerals 6a are particles constituting the trapping layer 6 (the particles 6a constituting the trapping layer 6). When the abovementioned image observed with the SEM has such a state as shown in FIG. 8, a distance L between two of the particles 6a constituting the trapping layer 6 is measured by image processing software (Image-Pro Plus 7.0 (trade name) manufactured by Nihon Visual Science, Inc.). It is to be noted that for the distance L between the two particles 6a constituting the trapping layer 6, such a straight line as denoted with reference symbol P is drawn in the image obtained by the image processing software as shown in FIG. 8, and "the distance L between the particles 6a" on the straight line P is measured. As to the straight line P, any ten straight lines P are drawn in the image obtained by the above image processing software and an average value of obtained values is an "average pore diameter of the trapping layer".

A membrane thickness of the trapping layer is preferably from 5 to 50 further preferably from 10 to 40 μm, and especially preferably from 10 to 30 μm. When the membrane thickness of the trapping layer is smaller than 5 μm, the PM included in the exhaust gas passes through the pores of the partition walls to leak outside from the plugged honeycomb structure sometimes in the case where the plugged honeycomb structure is used as the filter. On the other hand, when the membrane thickness of the trapping layer is in excess of 50 μm, the initial pressure loss of the plugged honeycomb structure heightens sometimes.

Figure 9:
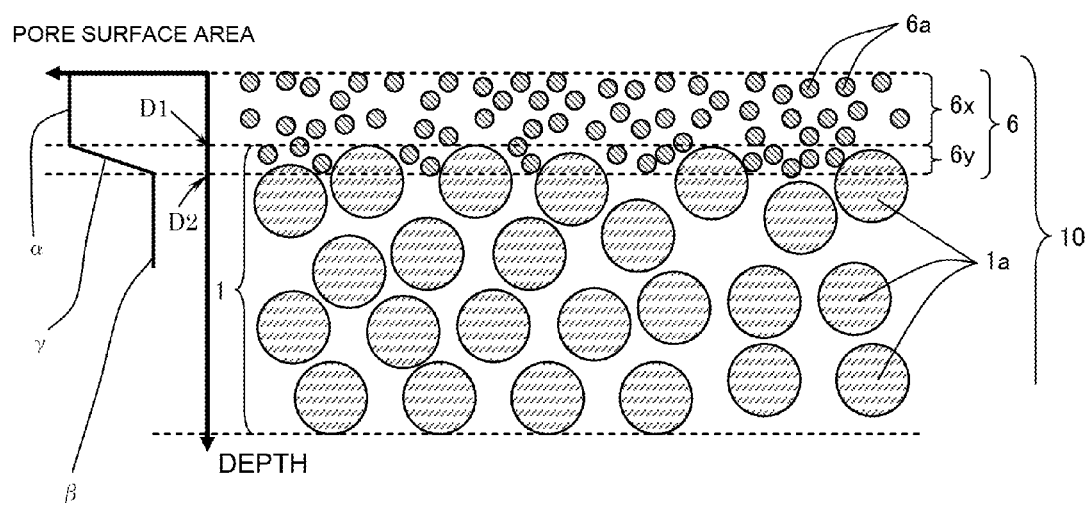
FIG. 9 is a schematic view showing an enlarged cross section of the partition wall base material and the trapping layer in the one embodiment of the plugged honeycomb structure of the present invention.

As shown in FIG. 9, the trapping layer 6 may be constituted of a surface layer 6x positioned on an outer side than the surface of the partition wall base material 1 and a deep layer 6y positioned on an inner side than the surface of the partition wall base material 1 (in the pores). Hereinafter, the partition wall base material 1 and the trapping layer 6 disposed on the surface of the partition wall base material 1 will generically be referred to as a "partition wall 10" sometimes. FIG. 9 is a schematic view showing an enlarged cross section of the partition wall base material and the trapping layer in the one embodiment of the plugged honeycomb structure of the present invention. FIG. 9 shows a graph beside the partition wall base material 1 (on the left side of a paper surface). This graph is a graph (a depth-pore surface area graph) in which the ordinate indicates a "pore surface area" and the abscissa indicates a "depth from the surface of the partition wall (the surface exposed on the side of each cell of the trapping layer)". The "depth-pore surface area graph" shown in FIG. 9 indicates that the pore surface area of the surface layer 6x of the trapping layer 6 is largest and that the pore surface area of a region where the partition wall base material 1 is only present is smallest. Furthermore, the "depth-pore surface area graph" also indicates that the pore surface area of a portion where the deep layer 6y of the trapping layer 6 is present (a portion where the deep layer 6y and the partition wall base material 1 are mixed) gradually decreases from a position where the portion comes in contact with the surface layer 6x toward a region (a position) where the partition wall base material 1 is only present. It is to be noted that the pore surface area shown in FIG. 9 is a pore surface area per unit volume. Here, the "pore surface area" means the area of a wall surface in each pore (the surface of the partition wall base material or the trapping layer exposed in the pore). Furthermore, the "pore surface area per unit volume" means a total value of the "pore surface areas" of all the pores present in the unit volume of the material constituting the partition wall. A method of measuring "the pore surface area per unit volume" is as follows. First, similarly to the measuring method of the porosity of the trapping layer, the partition wall base material and the trapping layer in the cut surface are observed with the scanning electron microscope (SEM). The partition wall base material and the trapping layer in the observed SEM image are divided by a width of 5 μm, from a central portion of the partition wall base material (the central portion in a thickness direction) toward the surface layer on the image (by image analysis), and each "divided portion (divided region)" is subjected to the following processing. A circumference length and an area of each divided portion in the material constituting the partition wall are measured by using image analysis software. "A circumference length/area" is obtained as the pore surface area per unit volume of the divided portion. Here, "the circumference length" is obtained by distinguishing a portion where the material is present and a portion (the pore) where the material is not present in each "divided portion" and adding up lengths of boundary lines between each portion where the material is present and each pore. The pore surface area per unit volume of the divided portion closest to the surface is obtained as the pore surface area per unit volume of the trapping layer 6, and the pore surface area per unit volume of the divided portion of the central portion of the partition wall base material is obtained as the pore surface area per unit volume of the partition wall base material 1. The same image analysis software as in the image analysis software used when the porosity of the trapping layer is measured is usable.

Here, a method of specifying "a boundary portion between the surface layer 6x of the trapping layer 6 and the deep layer 6y of the trapping layer 6" and "a boundary portion between the region where the deep layer 6y of the trapping layer 6 as well as the partition wall base material 1 are mixed and the region where the partition wall base material 1 is only present" is as follows. A portion between the central portion of the partition wall base material 1 (the central portion in the thickness direction) and the surface of the trapping layer is divided by a width of 5 μm, and the pore surface area per unit volume is measured in each "divided portion (divided region)". The "dividing" of the partition wall 10 is preferably performed by the image analysis. In this case, the pore surface area is preferably obtained by using the SEM image. The pore surface area of the divided portion closest to the surface of the surface layer 6x of the trapping layer 6 (the region where the partition wall base material 1 is not present) is obtained as the pore surface area of the surface layer 6x. The pore surface area of the divided portion closest to the central portion of the partition wall base material 1 is obtained as the pore surface area of the region where the partition wall base material 1 is only present (the pore surface area of the partition wall base material 1). Furthermore, in such a "depth-pore surface area" coordinate as shown in FIG. 9, a "straight line α" and a "straight line β" described as follows are drawn in parallel with a "depth" axis (an x-axis). The straight line α is a straight line along which a value of a "pore surface area" axis (a y-axis) is a value of the "pore surface area of the surface layer 6x". The straight line β is a straight line along which the value of the "pore surface area" axis (the y-axis) is a value of the "pore surface area of the region where the partition wall base material 1 is only present". Furthermore, in the graph shown in FIG. 9, "a straight line γ" described as follows is drawn. The straight line γ is a straight line obtained by subjecting "a measurement value of the pore surface area" of each of a plurality of "divided portions" in the region where the deep layer 6y and the partition wall base material 1 are mixed to linear approximation (least-squares method).

Furthermore, a value of the depth axis (x-axis) in an intersection between the straight line α and the straight line γ is obtained as a "depth D1". The "depth D1" is a depth of the boundary portion between the surface layer 6x of the trapping layer 6 and the deep layer 6y of the trapping layer 6. A value of the depth axis (x-axis) in an intersection between the straight line β and the straight line γ is obtained as a "depth D2". The "depth D2" is a depth of the boundary portion between the region where the deep layer 6y of the trapping layer 6 as well as the partition wall base material 1 are mixed and the region where the partition wall base material 1 is only present.

Therefore, when a value of "the depth D1" is subtracted from a value of "the depth D2", a thickness of the deep layer 6y of the trapping layer 6 is obtained. Furthermore, the value of the "depth D2" of the "boundary portion between the region where the deep layer 6y of the trapping layer 6 as well as the partition wall base material 1 are mixed and the region where the partition wall base material 1 is only present" is the same as the thickness of the trapping layer 6. Furthermore, the depth D1 of the "boundary portion between the surface layer 6x of the trapping layer 6 and the deep layer 6y of the trapping layer 6" is the same as a thickness of the surface layer 6x of the trapping layer 6. Hereinafter, in the present description, the "thickness of the trapping layer 6" means the abovementioned "value of the depth D2". In addition, a "thickness of the trapping layer penetrating into the pores formed in the partition wall base material" means a "value of the depth D2-the depth D1".

A part of the trapping layer preferably penetrates into the pores formed in the partition wall base material, and the thickness of the trapping layer penetrating into the pores formed in the partition wall base material is preferably from 0.1 to 20 μm. The thickness of the trapping layer penetrating into the pores formed in the partition wall base material is further preferably from 0.1 to 15 μm and especially preferably from 0.1 to 10 μm. When the thickness of the trapping layer penetrating into the pores formed in the partition wall base material is in excess of 20 μm, an initial pressure loss of the plugged honeycomb structure heightens sometimes.

Figure 10:
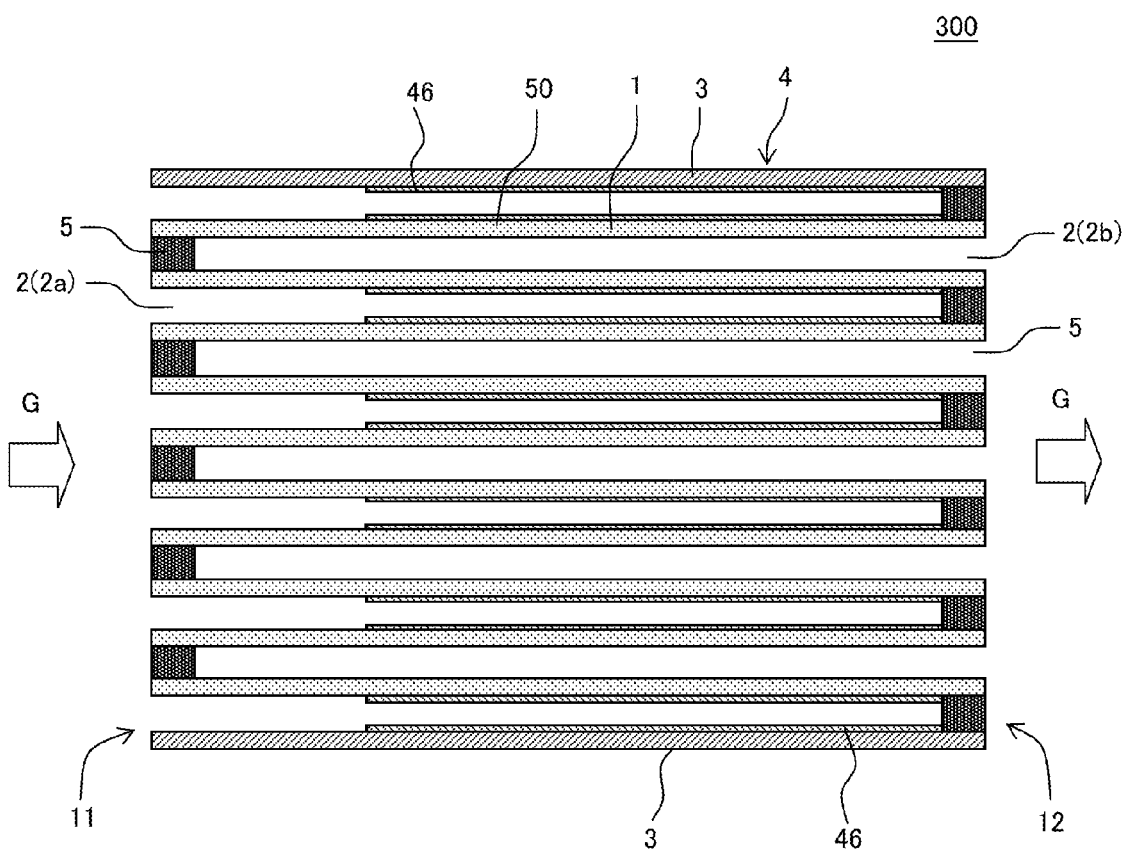
FIG. 10 is a schematic sectional view showing a cross section of still another embodiment of the plugged honeycomb structure of the present invention which is parallel to a cell extending direction.

The plugged honeycomb structure may employ such a constitution as described as follows. Here, FIG. 10 is a schematic sectional view showing a cross section of still another embodiment of the plugged honeycomb structure of the present invention which is parallel to a cell extending direction. A plugged honeycomb structure 300 shown in FIG. 10 is the plugged honeycomb structure 300 including a pillar-shaped honeycomb structure body 4 and plugging portions 5 disposed in open ends of cells 2. The pillar-shaped honeycomb structure body 4 has partition walls 50 including a porous partition wall base material 1 and a porous trapping layer 46 disposed on the surface of the partition wall base material 1. The partition wall base material 1 and the plugging portions 5 of the honeycomb structure body 4 are constituted similarly to the partition wall base material 1 and the plugging portions 5 of the honeycomb structure body 4 of the plugged honeycomb structure 100 shown in FIG. 1 to FIG. 5. Here, a first end face 11 of the honeycomb structure body 4 shown in FIG. 10 is an end face on an inlet side of a fluid passing through the cells 2 and a second end face 12 of the honeycomb structure body 4 is an end face on an outlet side of the fluid passing through the cells 2. In the plugged honeycomb structure 300 shown in FIG. 10, the trapping layer 46 is disposed in a region of 20 to 80% of a longitudinal direction from the second end face 12 in the longitudinal direction from the first end face 11 toward the second end face 12 of the honeycomb structure body 4. That is, in the plugged honeycomb structure 300 shown in FIG. 10, the trapping layer 46 is not disposed on the surface of the partition wall base material 1 in the region of 20% of the above longitudinal direction from the first end face 11 of the honeycomb structure body 4. According to such a constitution, a balance between the initial pressure loss of the plugged honeycomb structure and the pressure loss during the deposition of the PM is suitably kept. It is to be noted that in the plugged honeycomb structure including the trapping layer, as shown in FIG. 1 to FIG. 5, the trapping layer 6 may be disposed in the whole region of the longitudinal direction from the first end face 11 toward the second end face 12 of the honeycomb structure body 4. In the plugged honeycomb structure 100 having such a constitution as shown in FIG. 1 to FIG. 5, it is possible to effectively inhibit the PM included in the exhaust gas from leaking outside from the plugged honeycomb structure 100. Therefore, even when the trapping layer 46 is disposed in a part of the longitudinal direction of the honeycomb structure body 4 as shown in FIG. 10, the trapping layer 46 is preferably disposed in at least the vicinity of the second end face 12 from the viewpoint that the leakage of the PM is inhibited. In particular, the trapping layer 46 is more preferably disposed in a region of 60 to 80% of the longitudinal direction from the second end face 12.

A thickness of a portion of the trapping layer which is positioned in a corner portion of each of the cells is preferably from one to three times as large as a thickness of a portion of the trapping layer which is positioned in a central portion of a side of the cell. According to such a constitution, a rise of the initial pressure loss of the plugged honeycomb structure can be inhibited. In particular, when the abovementioned constitution is employed, the thickness of the trapping layer is more uniform in the above corner portion and the central portion, so that it is prevented that the gas only passes a part of the trapping layer. Therefore, the gas passes through the whole trapping layer. Here, "the thickness of the portion of the trapping layer which is positioned in the corner portion of the cell" and "the thickness of the portion of the trapping layer which is positioned in the central portion of the side of the cell" will be described with reference to FIG. 11A and FIG. 11B. FIG.

Figure 11A:
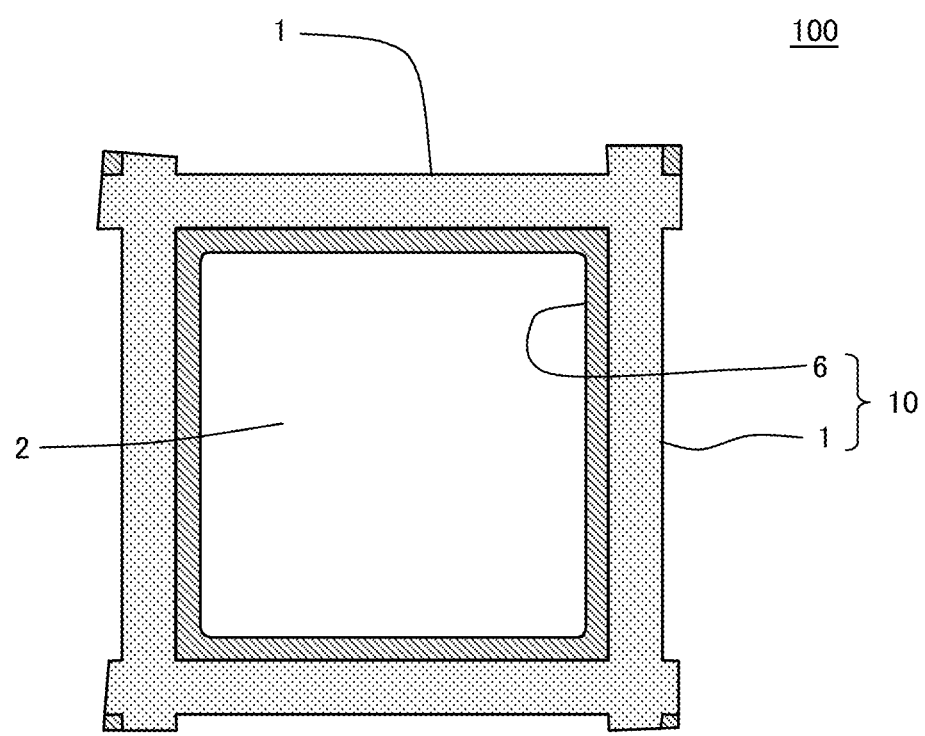
FIG. 11A is a schematic view showing a part of a cross section of one embodiment of a honeycomb filter of the present invention which is perpendicular to a cell extending direction.
Figure 11B:
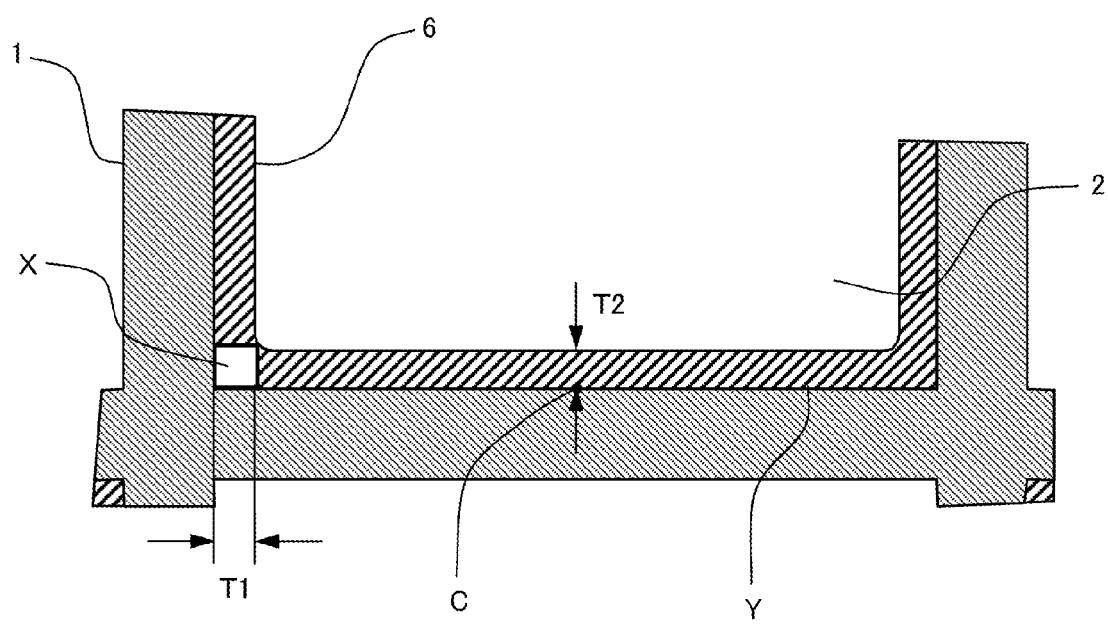
FIG. 11B is a schematic view showing a part of the cross section of the one embodiment of the honeycomb filter of the present invention which is perpendicular to the cell extending direction.

11A is a schematic view showing a part of a cross section of one embodiment of a honeycomb filter of the present invention which is perpendicular to a cell extending direction. FIG. 11B is a schematic view showing a part of the cross section of the one embodiment of the honeycomb filter of the present invention which is perpendicular to the cell extending direction. FIG. 11B is an enlarged view of the part of the cross section shown in FIG. 11A. The "thickness of the portion" of the trapping layer "which is positioned in the corner portion of the cell" is a length T1 of one side of "a square X" inscribed in the trapping layer 6 as shown in FIG. 11A and FIG. 11B. The "square X" is a virtual square positioned in the corner portion of the cell 2 in a state where each side thereof (i.e., each side of the square X) is parallel to each side of the cell 2. The "thickness of the portion" of the trapping layer "which is positioned in the corner portion of the cell" is usually a thickness of the thickest portion of the trapping layer 6. Additionally, the "thickness of the portion" of the trapping layer "which is positioned in the central portion of the side of the cell" is a thickness T2 of the trapping layer 6 in a central portion C of one side Y of the cell 2a s shown in FIG. 11B. The "thickness of the portion" of the trapping layer "which is positioned in the central portion of the side of the cell" is usually a thickness of the thinnest portion of the trapping layer 6. Hereinafter, "'the thickness (the membrane thickness) of the portion' of the trapping layer 'which is positioned in the corner portion of the cell'" will be referred to simply as "the thickness of the corner portion of the trapping layer" sometimes. Furthermore, "'the thickness (the membrane thickness) of the portion' of the trapping layer 'which is positioned in the central portion of the side of the cell' will be referred to simply as "the thickness of the central portion of the trapping layer" sometimes. In FIG. 11A and FIG. 11B, constitutional elements similar to those of the plugged honeycomb structure 100 shown in FIG. 1 are denoted with the same reference symbols, and description thereof is omitted sometimes.

In the cross section perpendicular to the cell extending direction, the thickness of the corner portion of the trapping layer is further preferably from 1.0 to 2.3 times, further more preferably from 1.0 to 2.0 times, and especially preferably from 1.0 to 1.6 times as large as the thickness of the central portion of the trapping layer. When the thickness of the corner portion of the trapping layer is more than three times as large as the thickness of the central portion of the trapping layer, it can be considered that the thickness of the trapping layer is non-uniform, and the gas intensively flows through a thin portion of the trapping layer sometimes. That is, when the gas intensively flows through the thin portion of the trapping layer, a flow speed of the gas of the thin portion locally increases, and as a result, the pressure loss enlarges sometimes. Furthermore, when the flow speed of the gas locally increases, the PM included in the exhaust gas passes through the pores of the partition walls and leaks outside from the plugged honeycomb structure (i.e., the trapping efficiency deteriorates) sometimes. The thickness of the trapping layer is a value measured by using the SEM image of the cross section perpendicular to the cell extending direction.

In addition, an exhaust gas purifying catalyst may be loaded onto at least one of each surface of the partition walls of the honeycomb structure body and each pore of the partition walls. An example of the catalyst is a platinum group metal loaded onto porous $\gamma$-$Al_2O_3$. It is to be noted that the catalyst loaded onto the partition walls of the honeycomb structure body is a constitutional element different from the partition walls (i.e., the partition wall base material and the trapping layer), and hence the hitherto described "material constituting the porous body" does not include the catalyst.

(2) Manufacturing Method of Plugged Honeycomb Structure (One Embodiment)

Next, one embodiment of a manufacturing method of the plugged honeycomb structure of the present embodiment will be described. The manufacturing method of the plugged honeycomb structure of the present embodiment relates to a method of manufacturing the hitherto described plugged honeycomb structure of the present invention. The manufacturing method of the plugged honeycomb structure of the present embodiment includes a step of applying slurry including a trapping layer forming ceramic raw material and combustible fine particles dispersed in water to the surface of the partition wall base material in the honeycomb structure body prior to firing (i.e., the partition wall base material prior to the firing). Hereinafter, the "step of applying the slurry including the trapping layer forming ceramic raw material and combustible fine particles dispersed in the water to the surface of the partition wall base material in the honeycomb structure body prior to the firing" will be referred to as a "trapping layer forming slurry applying step" sometimes. According to such a manufacturing method of the plugged honeycomb structure, in the cross section of the honeycomb structure body which is vertical to the cell extending direction, a uniformity of the thickness of the trapping layer is improved. Furthermore, the abovementioned combustible fine particles also serves as a pore former to form the pores in the trapping layer. In addition, the method includes the abovementioned step of applying the slurry and hence the penetrating portions of the trapping layer penetrating into the pores of the partition wall base material can be decreased.

In the manufacturing method of the plugged honeycomb structure of the present embodiment, a honeycomb formed body to prepare the honeycomb structure body is first prepared. This honeycomb formed body or a honeycomb dried body obtained by drying the honeycomb formed body is the abovementioned honeycomb structure body prior to the firing. That is, it can be considered that the manufacturing method of the plugged honeycomb structure of the present embodiment is characterized in that the abovementioned trapping layer forming slurry applying step is performed before the honeycomb formed body or the honeycomb dried body is fired. Hereinafter, the manufacturing method of the plugged honeycomb structure of the present embodiment will be described in more detail.

(2-1) Forming Step:

In the manufacturing method of the plugged honeycomb structure, in a forming step, a ceramic forming raw material containing a ceramic raw material is formed to prepare the honeycomb formed body including an unfired partition wall base material defining a plurality of cells which become through channels for a fluid (the formed body of the honeycomb structure body). Specifically, the forming raw material to prepare a porous body including $\alpha$-$Al_2O_3$, aluminum titanate and glass is first prepared. There is not any special restriction on the forming raw material, as long as a fired body obtained by firing the forming raw material can include the above three substances. For example, the forming raw material can be prepared by blending desirable amounts of $Al_2O_3$, $TiO_2$, talc, mica, clay and the like. Furthermore, as the forming raw material, it is possible to use $Al(OH)_3$, forsterite, feldspar, kaolin, $Na_2O$, $K_2O$, MgO, CaO, SrO, $Fe_2O_3$, $Y_2O_3$, $La_2O_3$, $Ga_2O_3$, $ZrO_2$, $CeO_2$, $SiO_2$, CuO, NiO, a carbonate thereof, a hydroxide thereof, a chloride thereof, glass having a regulated desirable composition or the like. Amounts of the abovementioned raw materials to be blended are adjusted, so that substances to be included in the obtained porous body and ratios of the substances can be regulated. The amount of the forming raw material to be blended is adjusted so that at least $\alpha$-$Al_2O_3$ constitutes the main phase (i.e., a mass ratio of 40 mass % or more) in the obtained fired body. Additionally, a dispersing medium or an additive may further be added to the forming raw material, in addition to the abovementioned raw materials.

Examples of the additive include a binder and a pore former. An example of the dispersing medium is water.

Examples of the binder include methylcellulose, hydroxypropoxyl cellulose, hydroxyethyl cellulose, carboxymethylcellulose, and polyvinyl alcohol. There is not any special restriction on the pore former, as long as the pore former becomes pores after fired, and examples of the pore former include starch, a foamable resin, a water absorbable resin, and silica gel.

Particle diameters of powder of the abovementioned raw material and an amount of the powder to be blended as well as particle diameters of powder of the pore former to be added and an amount of the powder to be blended are regulated, so that a porous body having desirable porosity and average pore diameter can be obtained.

Next, the obtained forming raw material is kneaded to form a kneaded material. There is not any special restriction on a method of forming the kneaded material, and an example of the method is a method in which a kneader, a vacuum pugmill or the like is used.

Next, the obtained kneaded material is extruded to prepare a honeycomb formed body. The extrusion can be performed by using a die having a desirable cell shape, partition wall thickness and cell density. Next, the obtained honeycomb formed body may be dried to obtain a honeycomb dried body prepared. There is not any special restriction on a drying method, and examples of the method include hot air drying, microwave drying, dielectric drying, reduced-pressure drying, vacuum drying, and freeze drying. Among these methods, the dielectric drying, the microwave drying or the hot air drying is preferably performed alone or any combination thereof is preferably performed. Furthermore, as drying conditions, a drying temperature is preferably set to 30 to 150° C. and a drying time is preferably set to one minute to two hours.

(2-2) First Plugging Step:

In the manufacturing method of the plugged honeycomb structure of the present embodiment, after the forming step, in a first plugging step, open ends of cells are preferably plugged only to one of a first end face and a second end face of the honeycomb formed body (or the honeycomb dried body). The first plugging step can be performed, for example, by charging a plugging material into the open ends of the cells of the honeycomb formed body.

The first plugging step is constituted of, for example, a masking step and a press-in step. The masking step is a step of attaching a sheet to one end face (e.g., the first end face) of the honeycomb formed body and making holes at positions to be superimposed on the "cells where the plugging portions are to be formed" in the sheet. The press-in step is a step of pressing an "end portion of the honeycomb formed body to which the sheet is attached" into a container where the plugging material is stored to press the plugging material into the cells of the honeycomb formed body. When the plugging material is pressed into the cells of the honeycomb formed body, the plugging material passes through the holes made in the sheet and is charged only into the cells communicating with the holes made in the sheet. The method of charging the plugging material can be performed in conformity with a heretofore known manufacturing method of the plugged honeycomb structure. The plugging material is charged into the open ends of the cells and then the honeycomb formed body (or the honeycomb dried body) may be dried again.

(2-3) Trapping Layer Forming Slurry Applying Step:

The trapping layer forming slurry applying step is a step of applying slurry including a trapping layer forming ceramic raw material and combustible fine particles dispersed in water to the surface of the partition wall base material in the honeycomb structure body prior to the firing. An example of the honeycomb structure body prior to the firing is the honeycomb formed body or the honeycomb dried body, and is especially preferably the abovementioned honeycomb formed body or honeycomb dried body obtained through the first plugging step.

The trapping layer forming ceramic raw material is preferably at least one selected from the group consisting of mullite, alumina, spinel, $Al(OH)_3$, aluminum titanate, titania, and MgO. Among these materials, at least one selected from the group consisting of mullite, alumina and spinel is further preferable.

Examples of a material of the combustible fine particles include carbon black, an acrylic resin, a styrene resin, and a urethane resin. In particular, the combustible fine particles are preferably made of carbon black.

An average particle diameter of the combustible fine particles is preferably from 0.05 to 0.5 μm, further preferably from 0.05 to 0.3 μm, and especially preferably from 0.05 to 0.2 μm. When the average particle diameter of the combustible fine particles is large, the uniformity of the thickness of the trapping layer worsens in the cross section of the honeycomb structure body which is vertical to the cell extending direction. On the other hand, there is not any special restriction on a lower limit value of the average particle diameter of the combustible fine particles, but the lower limit value of the average particle diameter of the actually available combustible fine particles is about 0.05 μm. The average particle diameter of the combustible fine particles is a value measured by a laser diffraction scattering method.

A volume ratio of the trapping layer forming ceramic raw material to the combustible fine particles is preferably from 20/80 to 80/20, further preferably from 30/70 to 70/30, and especially preferably from 30/70 to 60/40. When the ratio of the combustible fine particles is excessively large, the porosity of the trapping layer excessively heightens sometimes. On the other hand, when the ratio of the combustible fine particles is excessively small, the uniformity of the thickness of the trapping layer worsens in the cross section of the honeycomb structure body which is vertical to the cell extending direction.

The pore former may be added to the trapping layer forming ceramic raw material in addition to the combustible fine particles. As the pore former, graphite, starch, an acrylic resin, a phenol resin, a melamine resin, a urethane resin or the like is usable. An average particle diameter of the pore former is preferably from 0.5 to 50 μm, further preferably from 5 to 30 μm, and especially preferably from 5 to 20 μm. When the average particle diameter of the pore former is larger than 50 μm, the trapping efficiency deteriorates sometimes. When the average particle diameter of the pore former is smaller than 0.5 μm, the initial pressure loss heightens (i.e., the porosity does not sufficiently heighten) sometimes. The average particle diameter of the pore former is a value measured by the laser diffraction scattering method.

When the trapping layer forming slurry applying step is performed by using the honeycomb formed body (or the honeycomb dried body) obtained through the first plugging step, the step is preferably performed in a state where the honeycomb formed body (or the honeycomb dried body) is vertically disposed so that the end face of the honeycomb formed body (or the honeycomb dried body) which is plugged is positioned on a vertical upper side. In this case, the trapping layer forming slurry applying step is more preferably performed in a state where a film having holes made to correspond to the open ends of the cells other than the cells into which the plugging material is charged in the first plugging step is attached to the other end face of the honeycomb formed body (or the honeycomb dried body) positioned on a vertically lower side. The slurry including the trapping layer forming ceramic raw material and combustible fine particles dispersed in the water is charged from the end face positioned on the vertically lower side into the honeycomb formed body (or the honeycomb dried body) having the abovementioned state. Furthermore, after the slurry is charged and predetermined time has passed, the charged slurry is discharged. According to such a constitution, the above slurry is applied to the surface of the precursor of the partition wall base material of the honeycomb formed body (or the honeycomb dried body). A thickness or the like of the trapping layer to be finally obtained can be regulated by adjusting a concentration of the slurry and a retaining time during the charging. In addition, when the slurry is applied by the abovementioned method, for example, the trapping layer can be disposed only in the predetermined region of the longitudinal direction from the second end face in the longitudinal direction from the first end face toward the second end face of the honeycomb structure body. That is, when the end face positioned on the vertically lower side is the second end face in the honeycomb structure body, the region where the trapping layer is to be disposed can be changed by regulating a charging height of the slurry.

(2-4) Second Plugging Step:

After the trapping layer forming slurry applying step, in a second plugging step, the open ends of the cells are preferably plugged to at least one of the first end face and the second end face of the honeycomb formed body (or the honeycomb dried body). When the first plugging step is performed, the second plugging step is performed on the end face other than the end face into which the plugging material is charged in the first plugging step in the first end face and the second end face of the honeycomb formed body (or the honeycomb dried body). When the trapping layer forming slurry applying step is performed without performing the first plugging step, the open ends of the cells are plugged to both of the first end face and the second end face of the honeycomb formed body (or the honeycomb dried body). A method of charging the plugging material can be performed in conformity with the heretofore known manufacturing method of the plugged honeycomb structure. The plugging material is charged into the open ends of the cells and then the honeycomb formed body (or the honeycomb dried body) may be dried again.

(2-5) Firing Step:

Next, the honeycomb formed body (or the honeycomb dried body) in which the plugging material is charged into the open ends of the cells is fired. An obtained honeycomb fired body becomes the plugged honeycomb structure of the present embodiment. A firing temperature is preferably from 1400 to 1600° C. and further preferably from 1400 to 1500° C. A firing time is preferably from about one to ten hours. The firing can be performed in, for example, an air atmosphere, a steam atmosphere, or a hydrocarbon gas combustion atmosphere.

According to the manufacturing method of the plugged honeycomb structure of the present embodiment, the plugged honeycomb structure of the present invention can easily be manufactured. However, in the manufacturing method of the plugged honeycomb structure of the present embodiment, when the hitherto described "trapping layer forming slurry applying step" is performed on the honeycomb structure body prior to the firing, the other manufacturing steps can suitably be changed on the basis of ordinary knowledge of a person skilled in the art. For example, the preparing method of the honeycomb formed body (the forming step) and the plugging material charging method (the first plugging step and the second plugging step) are not limited to the abovementioned manufacturing steps. Furthermore, the order of the respective manufacturing steps can suitably be changed on the basis of the ordinary knowledge of the person skilled in the art, as long as the trapping layer forming slurry applying step is performed prior to the firing step.

(3) Manufacturing Method of Plugged Honeycomb Structure (Another Embodiment)

Next, another embodiment of the manufacturing method of the plugged honeycomb structure will be described. In the manufacturing method described as follows, in place of applying the slurry to the surface of the partition wall base material prior to the firing to form the trapping layer as in the abovementioned one embodiment of the manufacturing method, a trapping layer is formed to a fired body obtained by firing a honeycomb formed body. That is, the manufacturing method of the plugged honeycomb structure of this other embodiment includes a step of allowing a trapping layer forming ceramic raw material to flow into cells of the honeycomb fired body obtained by firing the honeycomb formed body so that the trapping layer forming ceramic raw material adheres to the surface of a partition wall base material. There is not any special restriction on a method of allowing the trapping layer forming ceramic raw material to flow into the cells of the honeycomb fired body, and an example of the method is a method of dispersing the trapping layer forming ceramic raw material in a gas to form an aerosol and allowing the aerosol to flow into the cells.

The trapping layer forming ceramic raw material in the other embodiment is preferably at least one selected from the group consisting of mullite, alumina, spinel, $Al(OH)_3$, aluminum titanate, titania, MgO, SiC, $Si_3N_4$, silica, zirconium silicate, and zirconia. Among these materials, at least one selected from the group consisting of mullite, alumina, spinel, silica, and SiC is further preferable.

EXAMPLES

Hereinafter, the present invention will further specifically be described in accordance with examples, but the present invention is not limited to these examples.

Example 1

In Example 1, a forming raw material to prepare a honeycomb structure body was first prepared. The forming raw material was prepared by adding an appropriate amount of water to powder obtained by mixing 3900 g of $\alpha$-$Al_2O_3$ powder, 750 g of $TiO_2$ powder, 300 g of talc powder, 50 g of mica powder, 50 g of starch, and 200 g of methylcellulose. An average particle diameter of the $\alpha$-$Al_2O_3$ powder was 42 µm. An average particle diameter of the $TiO_2$ powder was 0.4 µm. An average particle diameter of the talc powder was 11 µm. An average particle diameter of the mica powder was 42 µm.

Next, the obtained forming raw material was kneaded with a kneader and then kneaded with a vacuum pugmill to form a kneaded material. Next, the obtained kneaded material was extruded to prepare a honeycomb formed body. As to the honeycomb formed body after fired, a thickness of a partition wall base material became 300 µm and a cell density became 46.5 cells/cm². A cell shape of the honeycomb formed body became square after fired. The honeycomb formed body was formed into a quadrangular prismatic pillar shape having square end faces. A length of one side of each end face of the quadrangular prismatic pillar-shaped honeycomb formed body after fired was 35 mm.

Next, the honeycomb formed body was dried to obtain a honeycomb dried body. As to the drying, microwave drying was first performed and then hot air drying was performed. Next, the honeycomb dried body was cut so that a length of the honeycomb dried body in a cell extending direction was a predetermined length.

Next, a plugging material was charged into open ends of predetermined cells on the side of a first end face and open ends of the residual cells on the side of a second end face of the obtained honeycomb dried body, and then the hot air drying was performed again, to form a plugging portion in one of the open ends of each cell on the side of one of the first end face and the second end face. The plugging material was prepared by adding an appropriate amount of water to powder obtained by mixing 3900 g of $\alpha$-$Al_2O_3$ powder, 750 g of $TiO_2$ powder, 300 g of talc powder, 50 g of mica powder, 500 g of starch, and 10 g of methylcellulose. Average particle diameters of the $\alpha$-$Al_2O_3$ powder, the $TiO_2$ powder, the talc powder and the mica powder were the same as those of the powders used in the forming raw material to prepare the honeycomb structure body.

Next, the obtained honeycomb dried body was degreased. The degreasing was performed at 450° C. for five hours. Next, the degreased honeycomb dried body was fired to obtain a honeycomb fired body. The firing was performed at 1500° C. in the air atmosphere for four hours. This honeycomb fired body became the honeycomb structure body having a porous partition wall base material defining a plurality of cells which became through channels for a fluid and extended from a first end face to a second end face.

Next, SiC powder formed into an aerosol was passed through the obtained honeycomb fired body and SiC particles were deposited on the surface of the partition wall base material of the honeycomb fired body. An average particle diameter of the SiC powder was 2 µm. Afterward, the honeycomb fired body in which the SiC particles were deposited on the surface of the partition wall base material was subjected to a heat treatment at 1200° C. in the air atmosphere for five hours. The SiC particles deposited on the surface of the partition wall base material became a trapping layer. As described above, a plugged honeycomb structure of Example 1 was prepared.

The partition wall base material constituting the plugged honeycomb structure of Example 1 was constituted of a porous body including $\alpha$-$Al_2O_3$ as a main phase and further including aluminum titanate and glass. A mass ratio between α-Al$_2$O$_3$ and aluminum titanate was 85/15. A mass percentage of the glass was 7 mass % to a total of α-Al$_2$O$_3$, aluminum titanate and glass. A composition of the partition wall base material (the porous body) was qualitatively and quantitatively determined by the following method. First, as to partition walls constituting the plugged honeycomb structure, a portion of each partition wall in which the trapping layer was disposed was ground to obtain the partition wall base material from which the trapping layer was removed. An amount of the glass was quantitatively determined by immersing the partition wall base material from which the trapping layer was removed into an acid and dissolving the glass in the partition wall base material. Afterward, an amount of α-Al$_2$O$_3$ in a residue was quantitatively determined by XRD and a balance was Al$_2$TiO$_5$. A column of "partition wall base material" of Table 1 shows, as "Al$_2$O$_3$/Al$_2$TiO$_5$", a plugged honeycomb structure in which a partition wall base material is constituted of a porous body including α-Al$_2$O$_3$ as a main phase and further including aluminum titanate and glass as in the plugged honeycomb structure of Example 1. Furthermore, a column of "trapping layer" of Table 1 shows, as "SiC", a plugged honeycomb structure in which a trapping layer is formed of SiC particles as in the plugged honeycomb structure of Example 1.

As to the partition wall base material of the honeycomb structure body constituting the plugged honeycomb structure of Example 1, a porosity (%), an average pore diameter (m), a true density (g/cm$^3$) and a heat capacity (J/K/cm$^3$) of a material constituting the porous body were measured. Table 1 shows measurement results. It is to be noted that a column of "heat capacity (J/K/cm$^3$)" of Table 1 shows a value of the abovementioned "heat capacity (J/K/cm$^3$) of the material constituting the porous body". The true density (g/cm$^3$) and the porosity (%) were measured by Archimedes method (JIS R 1634). The average pore diameter (μm) was measured by mercury porosimetry (JIS R 1655). The heat capacity (J/K/cm$^3$) was measured by the following method. First, a heat capacity (J/K/g) per unit mass of the material constituting the porous body at 600° C. was measured by using an adiabatic type specific heat measurement system manufactured by ULVAC-RICO, Inc. Next, the obtained heat capacity (J/K/g) per unit mass was multiplied by the true density (g/cm$^3$) of the material constituting the porous body which was measured at room temperature by the Archimedes method, to calculate the heat capacity (J/K/cm$^3$) per unit volume of the material constituting the porous body.

TABLE 1

| | Porosity (%) | Ave. pore dia. (μm) | True density (g/cm$^3$) | Heat capacity (J/K/cm$^3$) |
|---|---|---|---|---|
| Partition wall base materials of Examples 1 to 9 and Comparative Example 1 | 33 | 10 | 3.82 | 4.49 |
| Partition wall base materials of Comparative Examples 2 and 3 | 32 | 17 | 2.80 | 3.04 |

As to the trapping layer constituting the plugged honeycomb structure of Example 1, a porosity (%), an average pore diameter (μm), a membrane thickness (μm), a penetration thickness (μm) and a cross section uniformity were measured by the following method. Table 2 shows measurement results. Additionally, in the above measurement, the plugged honeycomb structure was cut into five portions having an equal length in a cell extending direction, and each measurement was performed to a cut surface closest to an end face on an outlet side of the fluid passing through the cells. Furthermore, as to the trapping layer constituting the plugged honeycomb structure of Example 1, a ratio of a prepared membrane length and a thermal expansion coefficient (ppm/K) were measured by the following method. Table 2 shows measurement results. A material constituting the trapping layer was analyzed by the following method. First, there were prepared a first powder obtained by pulverizing the partition walls in which the trapping layer was disposed on the surface of the partition wall base material, and a second powder obtained by grinding the portion of the trapping layer from the partition walls and pulverizing the porous body in which the partition wall base material was only present. Next, the first powder and the second powder were qualitatively determined by using X-ray diffraction (XRD). In addition, each of the first powder and the second powder was quantitatively determined by an internal standard method of the X-ray diffraction (XRD). Then, the qualitative result and quantitative result of the first powder were compared with the qualitative result and quantitative result of the second powder to analyze the material constituting the trapping layer.

[Porosity (%) of Trapping Layer]

First, one of the five equally divided portions of the honeycomb structure which was closest to the end face on the outlet side of the fluid was buried in a resin, the cut surface of the cut honeycomb structure body (the cut surface closest to the end face on the outlet side) was polished, and the trapping layer in the cut surface was observed with a scanning electron microscope (SEM). An observed SEM image (5000 magnification) was used to measure a ratio of pores formed in the trapping layer by using image processing software (Image-Pro Plus 7.0 (trade name) manufactured by Nihon Visual Science, Inc.). The "ratio of the pores" measured as described above was the porosity (%) of the trapping layer.

[Average Pore Diameter (μm) of Trapping Layer]

Similarly to the measuring method of the porosity (%) of the trapping layer, the trapping layer in the cut surface was observed with the scanning electron microscope (SEM) and a distance L between two particles 6a constituting a trapping layer 6 as shown in FIG. 8 was measured by using the image processing software. The same image processing software as that used in the measurement of the porosity (%) of the trapping layer was used. The distance L between the two particles 6a constituting the trapping layer 6 was obtained by drawing such a straight line as denoted with reference symbol P in FIG. 8 in an image obtained by the image processing software and measuring the "distance L between the particles 6a" on the straight line P. For the straight line P, any ten straight lines P were drawn in the image obtained by the above image processing software and an average value of obtained values was the "average pore diameter (μm) of the trapping layer".

[Membrane Thickness (μm)]

Similarly to the measuring method of the porosity (%) of the trapping layer, the trapping layer and the partition wall base material in the cut surface were observed with the scanning electron microscope (SEM) to prepare such a "depth-pore surface area graph" as shown in FIG. 9. A value of a "depth D2" in the "depth-pore surface area graph" was obtained as the "membrane thickness (μm) of the trapping layer". The membrane thickness (μm) of the trapping layer is a thickness (μm) of the trapping layer.

[Penetration Thickness (μm) of Trapping Layer]

A penetration thickness (μm) of the trapping layer means a thickness of a deep layer 6y of a trapping layer 6, when the trapping layer 6 is constituted of a surface layer 6x and the deep layer 6y as shown in FIG. 9. That is, a value obtained by subtracting a value of a "depth D1" of the surface layer 6x from a value of a "depth D2" of the deep layer 6y is the "penetration thickness (μm) of the trapping layer". In the measurement of the penetration thickness (μm) of the trapping layer, similarly to the measuring method of the porosity (%) of the trapping layer, the trapping layer and the partition wall base material in the cut surface were first observed with the scanning electron microscope (SEM) to prepare such a "depth-pore surface area graph" as shown in FIG. 9. A "value of the depth D2−the depth D1" was obtained from the "depth-pore surface area graph" and the value was obtained as the "penetration thickness (μm) of the trapping layer".

[Ratio of Prepared Membrane Length of Trapping Layer]

A ratio of a prepared membrane length is a ratio (%) of a length of a region where the trapping layer is disposed to a length of the honeycomb structure body in the cell extending direction. Therefore, when the ratio of the prepared membrane length of the trapping layer is 100%, the trapping layer is disposed in the whole region of the honeycomb structure body in the cell extending direction. When the ratio of the prepared membrane length of the trapping layer is 20%, the trapping layer is disposed in a region of 20% of a length of the honeycomb structure body from the end face of the honeycomb structure body on the outlet side of the fluid. A measuring method of the prepared membrane length is as follows. First, the plugged honeycomb structure was cut in parallel with the cell extending direction. Next, the cut surface was observed with an optical microscope. For example, by this observation, such a cut surface as shown in FIG. 10 can be observed. Next, in any portion of the cut surface, the cut surface was observed with the SEM. For example, by this observation, such an enlarged cut surface as shown in FIG. 9 can be observed. From an SEM image observed as described above, the presence/absence of the trapping layer was confirmed and the prepared membrane length was measured.

[Cross Section Uniformity]

A cross section uniformity is magnifying power (magnification) of a "thickness of a portion" of the trapping layer "which is positioned in a corner portion of each cell" to a "thickness of a portion" of the trapping layer "which is positioned in a central portion of a side of the cell". To measure the cross section uniformity, similarly to the measuring method of the porosity (%) of the trapping layer, the trapping layer in the cut surface was first observed with the scanning electron microscope (SEM) to obtain such an image as shown in FIG. 11B. The "thickness of the portion" of a trapping layer 6 "which was positioned in the corner portion of each cell 2" was obtained as a "length T1" of one side of a "square X" inscribed in the trapping layer 6. The "square X" is a virtual square positioned in the corner portion of the cell 2 in a state where each side thereof (i.e., each side of the square X) is parallel to each side of the cell 2. In addition, the "thickness of the portion" of the trapping layer 6 "which was positioned in the central portion of the side of the cell 2" was obtained as a "thickness T2" of the trapping layer 6 in a central portion C of one side Y of the cell 2. Furthermore, the magnifying power of the "length T1" to the "thickness T2" was obtained as the "cross section uniformity".

[Thermal Expansion Coefficient (ppm/K)]

For the thermal expansion coefficient (ppm/K), an average thermal expansion coefficient (ppm/K) of the partition walls (i.e., the partition wall base material in which the trapping layer was disposed) at 40 to 800° C. was measured with a differential detection type of thermal dilatometer. That is, a value shown in a column of "thermal expansion coefficient (ppm/K)" of Table 2 is a value of the average thermal expansion coefficient measured as to constitutional elements including the partition wall base material and the trapping layer disposed on the surface of the partition wall base material.

TABLE 2

| | Partition wall base material | Trapping layer | Slurry No. | Porosity (%) | Ave. pore dia. (μm) | Membrane thickness (μm) | Penetration thickness (μm) | Ratio of prepared membrane length | Cross section uniformity | Thermal expansion coefficient (ppm/K) |
|---|---|---|---|---|---|---|---|---|---|---|
| Example 1 | Al$_2$O$_3$/Al$_2$TiO$_5$ | SiC | — | 74% | 5 | 35 | 22 | 100% | 1.1 | 4.7 |
| Example 2 | Al$_2$O$_3$/Al$_2$TiO$_5$ | Al$_2$O$_3$ | 1 | 65% | 2 | 30 | 7 | 100% | 1.6 | 4.7 |
| Example 3 | Al$_2$O$_3$/Al$_2$TiO$_5$ | Al$_2$O$_3$ | 1 | 65% | 2 | 30 | 7 | 80% | 1.6 | 4.7 |
| Example 4 | Al$_2$O$_3$/Al$_2$TiO$_5$ | Al$_2$O$_3$ | 1 | 65% | 2 | 30 | 7 | 40% | 1.6 | 4.7 |
| Example 5 | Al$_2$O$_3$/Al$_2$TiO$_5$ | Al$_2$O$_3$ | 1 | 65% | 2 | 30 | 7 | 20% | 1.6 | 4.7 |
| Example 6 | Al$_2$O$_3$/Al$_2$TiO$_5$ | Al$_2$O$_3$ | 2 | 53% | 2 | 20 | 3 | 100% | 2.8 | 4.7 |
| Example 7 | Al$_2$O$_3$/Al$_2$TiO$_5$ | Al$_2$O$_3$ | 3 | 77% | 5 | 35 | 3 | 100% | 1.6 | 4.7 |
| Example 8 | Al$_2$O$_3$/Al$_2$TiO$_5$ | Al$_2$O$_3$ | 4 | 60% | 2 | 25 | 7 | 100% | 2.3 | 4.7 |
| Comparative Example 1 | Al$_2$O$_3$/Al$_2$TiO$_5$ | — | — | — | — | — | — | — | — | 4.7 |
| Comparative Example 2 | Si/SiC | SiC | — | 75% | 5 | 35 | 27 | 100% | 1.1 | 4.2 |
| Comparative Example 3 | Si/SiC | SiC | 5 | 65% | 2 | 30 | 7 | 100% | 1.6 | 4.2 |

In the plugged honeycomb structure of Example 1, an "evaluation of an initial pressure loss", an "evaluation of a pressure loss during deposition of PM", an "evaluation of PM leakage number" and an "evaluation of the highest temperature" were carried out by the following method. Table 3 shows evaluation results. All the abovementioned evaluations were carried out on the basis of a plugged honeycomb structure of Comparative Example 1 and each change ratio (%) was obtained. For example, the evaluation result of the plugged honeycomb structure of Example 1 is a value (the change ratio (%)) calculated in accordance with the following equation (1).

Change ratio (%)=(a measured value in the plugged honeycomb structure of Example 1−a measured value in the plugged honeycomb structure of Comparative Example 1)/(the measured value in the plugged honeycomb structure of Comparative Example 1)×100    (1)

[Evaluation of Initial Pressure Loss]

When air (room temperature) was passed through the plugged honeycomb structure at a constant flow rate, an air pressure difference between an outlet side and an inlet side of the plugged honeycomb structure was measured. The measured pressure difference was obtained as the initial pressure loss. The change ratio (%) of the initial pressure loss was obtained in accordance with the above equation (1).

[Evaluation of Pressure Loss During Deposition of PM]

A predetermined amount of PM (soot) was deposited in the plugged honeycomb structure and then an air pressure difference between the outlet side and the inlet side was measured when air (room temperature) was passed through the plugged honeycomb structure at a constant flow rate. The measured pressure difference was obtained as the pressure loss during the deposition of the PM. The change ratio (%) of the pressure loss during the deposition of the PM was obtained in accordance with the above equation (1).

[Evaluation of PM Leakage Number]

When a predetermined amount of PM (the soot) was passed through the plugged honeycomb structure, the number of particulates of the PM which flowed outside from the outlet-side end face of the plugged honeycomb structure was measured. The measured number of the particulates of the PM was obtained as the PM leakage number. The change ratio (%) of the PM leakage number was obtained in accordance with the above equation (1).

[Evaluation of Highest Temperature]

A predetermined amount of PM (the soot) was deposited in the plugged honeycomb structure and the highest temperature (° C.) in the plugged honeycomb structure was measured when regeneration was performed by burning and removing the PM. The change ratio (%) of the highest temperature was obtained in accordance with the above equation (1).

TABLE 3

| | Evaluation of initial pressure loss | Evaluation of pressure loss during PM deposition | Evaluation of PM leakage number | Evaluation of highest temperature |
|---|---|---|---|---|
| Example 1 | 33% | −56% | −94% | 0% |
| Example 2 | 31% | −64% | −94% | −1% |
| Example 3 | 7% | −64% | −75% | −1% |
| Example 4 | 4% | −52% | −47% | 0% |
| Example 5 | 2% | −40% | −25% | 0% |
| Example 6 | 57% | −32% | −63% | 0% |
| Example 7 | 15% | −68% | −75% | 0% |
| Example 8 | 41% | −52% | −78% | 0% |
| Comparative Example 1 | 0% | 0% | 0% | 0% |
| Comparative Example 2 | −6% | −52% | −94% | 21% |
| Comparative Example 3 | −7% | −68% | −94% | 20% |

Example 2

In Example 2, first, the procedures of Example 1 were repeated to prepare a honeycomb dried body. Furthermore, the procedures of Example 1 were repeated to cut the obtained honeycomb dried body so that a length of the honeycomb dried body in a cell extending direction was a predetermined length.

Next, a plugging material was charged into open ends of cells only to a first end face in the first end face and a second end face of the honeycomb dried body.

Next, a film was attached to the second end face of the honeycomb dried body to mask the second end face and holes were made in portions of this mask in which cells other than the cells including the plugging material charged thereinto in the first end face were disposed. In consequence, the cells into which the plugging material was charged in the first end face were closed with the plugging material and the mask in the first end face and the second end face, and the other cells were allowed to communicate from the first end face to the second end face. Next, slurry including a trapping layer forming raw material was separately prepared by the following method. Next, the masked honeycomb dried body was vertically disposed so that the first end face (the end face into which the plugging material was charged) was positioned on a vertically upper side, and the slurry including the trapping layer forming raw material was charged from the side of the second end face positioned on a vertically lower side (the masked end face). As described above, the slurry including the trapping layer forming raw material was applied only to the surface of a precursor of the partition wall base material defining the predetermined cells. The slurry including the trapping layer forming raw material was prepared as follows. 200 g of α-$Al_2O_3$ powder, 90 g of carbon black powder, 10 g of graphite powder, 30 g of a dispersing agent and 420 g of water were mixed to prepare the slurry including the trapping layer forming raw material. An average particle diameter of the α-$Al_2O_3$ powder was 3 μm and a density of the α-$Al_2O_3$ powder was 3.95 g/cm$^3$. An average particle diameter of the carbon black powder was 0.2 μm and a density of the carbon black powder was 1.8 g/cm$^3$. As the carbon black powder, "MA-100 (trade name)" manufactured by Mitsubishi Chemical Corporation was used. An average particle diameter of the graphite powder was 17 μm. As the dispersing agent, "Pegnol (trade name)" manufactured by TOHO Chemical Industry Co., Ltd. was used. A volume ratio between α-$Al_2O_3$ and carbon black was 50/50. Hereinafter, slurry used in Example 2 will be "slurry 1". A column of a "slurry No." of Table 2 shows the slurry used in Example 2 as the "slurry 1".

Next, the honeycomb dried body to which the slurry was applied was dried again. Next, the plugging material was charged into the open ends of the cells to the end face on the side opposite to the end face into which the plugging material was previously charged.

Next, the honeycomb dried body was degreased. The degreasing was performed at 450° C. for five hours. Next, the degreased honeycomb dried body was fired to obtain a honeycomb fired body. The firing was performed at 1500° C. in the air atmosphere for four hours. This honeycomb fired body is a plugged honeycomb structure of Example 2. A column of "trapping layer" of Table 1 shows, as "$Al_2O_3$", a plugged honeycomb structure in which a trapping layer is formed of α-$Al_2O_3$ particles as in the plugged honeycomb structure of Example 2.

Example 3

The procedures of Example 2 were repeated except that a ratio of a prepared membrane length of a trapping layer was 80% as shown in Table 2, to prepare a plugged honeycomb structure. Specifically, in Example 3, a masked honeycomb dried body was vertically disposed so that a first end face was positioned on a vertically upper side and slurry including a trapping layer forming raw material was charged into a region of 80% of a cell extending direction from the side of a second end face (the masked end face) positioned on a vertically lower side. In Example 3, the trapping layer was formed in the region of 80% of the cell extending direction from the end face on an outlet side of a honeycomb structure body by such a method as described above.

Example 4

The procedures of Example 2 were repeated except that a ratio of a prepared membrane length of a trapping layer was 40% as shown in Table 2, to prepare a plugged honeycomb structure. Specifically, in Example 4, a masked honeycomb dried body was vertically disposed so that a first end face was positioned on a vertically upper side and slurry including a trapping layer forming raw material was charged into a region of 40% of a cell extending direction from the side of a second end face (the masked end face) positioned on a vertically lower side. In Example 4, the trapping layer was formed in the region of 40% of the cell extending direction from the end face on an outlet side of a honeycomb structure body by such a method as described above.

Example 5

The procedures of Example 2 were repeated except that a ratio of a prepared membrane length of a trapping layer was 20% as shown in Table 2, to prepare a plugged honeycomb structure. Specifically, in Example 5, a masked honeycomb dried body was vertically disposed so that a first end face was positioned on a vertically upper side and slurry including a trapping layer forming raw material was charged into a region of 20% of a cell extending direction from the side of a second end face (the masked end face) positioned on a vertically lower side. In Example 5, the trapping layer was formed in the region of 20% of the cell extending direction from the end face on an outlet side of a honeycomb structure body by such a method as described above.

Example 6

The procedures of Example 2 were repeated except that "slurry 2" prepared by the following method was used as slurry including a trapping layer forming raw material, to prepare a plugged honeycomb structure. The slurry including the trapping layer forming raw material (the slurry 2) was prepared by mixing 160 g of $\alpha$-$Al_2O_3$ powder, 115 g of styrene resin powder, 10 g of graphite powder, 20 g of a dispersing agent and 360 g of water. An average particle diameter of the $\alpha$-$Al_2O_3$ powder was 3 μm and a density of the $\alpha$-$Al_2O_3$ powder was 3.95 g/cm³. An average particle diameter of the styrene resin powder was 0.3 μm and a density of the styrene resin powder was 1.2 g/cm³. As the styrene resin powder, "Nipol (trade name); (a solid content of 52 mass %)" manufactured by ZEON CORPORATIOIN was used. An average particle diameter of the graphite powder was 17 μm. As the dispersing agent, "Pegnol (trade name)" manufactured by TOHO Chemical Industry Co., Ltd. was used. A volume ratio between $\alpha$-$Al_2O_3$ and styrene resin was 45/55. A column of "slurry No." of Table 2 shows the slurry used in Example 6 as the "slurry 2".

Example 7

The procedures of Example 2 were repeated except that "slurry 3" prepared by the following method was used as slurry including a trapping layer forming raw material, to prepare a plugged honeycomb structure. The slurry including the trapping layer forming raw material (the slurry 3) was prepared by mixing 120 g of $\alpha$-$Al_2O_3$ powder, 130 g of carbon black powder, 10 g of graphite powder, 25 g of a dispersing agent and 420 g of water. An average particle diameter of the $\alpha$-$Al_2O_3$ powder was 3 μm and a density of the $\alpha$-$Al_2O_3$ powder was 3.95 g/cm³. An average particle diameter of the carbon black powder was 0.2 μm and a density of the carbon black powder was 1.8 g/cm³. As the carbon black powder, "MA-100 (trade name)" manufactured by Mitsubishi Chemical Corporation was used. An average particle diameter of the graphite powder was 17 μm. As the dispersing agent, "Pegnol" manufactured by TOHO Chemical Industry Co., Ltd. was used. A volume ratio between $\alpha$-$Al_2O_3$ and carbon black was 30/70. A column of "slurry No." of Table 2 shows the slurry used in Example 7 as the "slurry 3".

Example 8

The procedures of Example 2 were repeated except that "slurry 4" prepared by the following method was used as slurry including a trapping layer forming raw material, to prepare a plugged honeycomb structure. The slurry including the trapping layer forming raw material (the slurry 4) was prepared by mixing 280 g of $\alpha$-$Al_2O_3$ powder, 55 g of carbon black powder, 10 g of graphite powder, 30 g of a dispersing agent and 420 g of water. An average particle diameter of the $\alpha$-$Al_2O_3$ powder was 3 μm and a density of the $\alpha$-$Al_2O_3$ powder was 3.95 g/cm³. An average particle diameter of the carbon black powder was 0.2 μm and a density of the carbon black powder was 1.8 g/cm³. As the carbon black powder, "MA-100 (trade name)" manufactured by Mitsubishi Chemical Corporation was used. An average particle diameter of the graphite powder was 17 μm. As the dispersing agent, "Pegnol (trade name)" manufactured by TOHO Chemical Industry Co., Ltd. was used. A volume ratio between $\alpha$-$Al_2O_3$ and carbon black was 70/30. A column of "slurry No." of Table 2 shows the slurry used in Example 8 as the "slurry 4".

Comparative Example 1

The procedures of Example 1 were repeated except that a trapping layer was not deposited on the surface of a partition wall base material of a honeycomb fired body by passing an aerosol through the obtained honeycomb fired body, to prepare a plugged honeycomb structure. That is, in the plugged honeycomb structure of Comparative Example 1, a trapping layer is not formed on the surface of the partition wall base material.

Comparative Example 2

The procedures of Example 1 were repeated except that materials prepared by the following method were used as a forming raw material and a plugging material to prepare a honeycomb structure body and except that firing was performed at 1450° C. in an Ar atmosphere for two hours, to prepare a plugged honeycomb structure. The forming raw material was prepared by adding an appropriate amount of water to powder prepared by mixing 3250 g of $\alpha$-SiC powder, 1750 g of Si powder, 107 g of talc powder, 180 g of kaolin powder, 83 g of $\alpha$-$Al_2O_3$ powder, 50 g of clay, 200 g of starch, and 300 g of methylcellulose. The plugging material was prepared by adding an appropriate amount of water to powder prepared by mixing 3250 g of $\alpha$-SiC powder, 1750 g of Si powder, 107 g of talc powder, 180 g of kaolin powder, 83 g of $\alpha$-$Al_2O_3$ powder, 50 g of clay, 500 g of starch, and 10 g of methylcellulose. Average particle diameters of the respective raw material powders used in the forming raw material and the plugging material were as follows. The average particle diameter of the α-SiC powder was 56 μm. The average particle diameter of the Si powder was 5 μm. The average particle diameter of the talc powder was 11 μm. The average particle diameter of the kaolin powder was 7 μm. The average particle diameter of the α-Al$_2$O$_3$ powder was 5 μm.

Comparative Example 3

In Comparative Example 3, first, the procedures of Comparative Example 2 were repeated to prepare a honeycomb dried body. Afterward, the procedures of Example 2 were repeated except that "slurry 5" prepared by the following method was used as slurry including a trapping layer forming raw material and except that degreasing was performed at 600° C. for one hour, to prepare a plugged honeycomb structure. The slurry including the trapping layer forming raw material (the slurry 5) was prepared by mixing 160 g of α-SiC powder, 465 g of carbon black powder, and 20 g of water. An average particle diameter of the α-SiC powder was 2 μm and a density of the α-SiC powder was 3.22 g/cm$^3$. An average particle diameter of the carbon black powder was 0.2 μm and a density of the carbon black powder was 1.8 g/cm$^3$. As the carbon black powder, "Aqua-Black dispersing liquid (trade name); (a solid content of 19 mass %)" manufactured by Tokai Carbon Co., Ltd. was used. A volume ratio between α-SiC and carbon black was 45/55. A column of "slurry No." of Table 2 shows the slurry used in Comparative Example 3 as the "slurry 5".

As to the trapping layer of the plugged honeycomb structure of each of Examples 2 to 8 and Comparative Examples 2 and 3, the procedures of Example 1 were repeated to measure a porosity (%), an average pore diameter (μm), a membrane thickness (μm), a penetration thickness (μm), a ratio of a prepared membrane length, and a cross section uniformity. Furthermore, as to the partition walls of the plugged honeycomb structure of each of Examples 2 to 8 and Comparative Examples 1 to 3, the procedures of Example 1 were repeated to measure a thermal expansion coefficient (ppm/K). Table 2 shows respective measurement results. In addition, as to the plugged honeycomb structure of each of Examples 2 to 8 and Comparative Examples 1 to 3, the procedures of Example 1 were repeated to carry out an "evaluation of an initial pressure loss", an "evaluation of a pressure loss during PM deposition", an "evaluation of a PM leakage number" and an "evaluation of the highest temperature". Table 3 shows the evaluation results.

(Results)

In plugged honeycomb structures of Examples 1 to 8, it was possible to obtain a suitable result in an evaluation of the highest temperature as compared with plugged honeycomb structures of Comparative Examples 2 and 3. Specifically, when the plugged honeycomb structures of Comparative Examples 2 and 3 were compared with a plugged honeycomb structure of Comparative Example 1 in which a trapping layer was not disposed, it was confirmed that the highest temperature during regeneration rose as much as about 20%. On the other hand, in the plugged honeycomb structures of Examples 1 to 8, the rise of the highest temperature during the regeneration was not confirmed even in comparison with the plugged honeycomb structure of Comparative Example 1.

Furthermore, in the plugged honeycomb structures of Examples 1 to 8, as compared with the plugged honeycomb structure of Comparative Example 1 in which the trapping layer was not disposed, an initial pressure loss increased, but it was possible to obtain a suitable effect in an evaluation of a pressure loss during PM deposition. Specifically, when the plugged honeycomb structures of Examples 1 to 8 were compared with the plugged honeycomb structure of Comparative Example 1 in which the trapping layer was not disposed, it was confirmed that a rise of the pressure loss from an initial value (the initial pressure loss) accompanying the deposition of the PM was inhibited.

Figure 12:
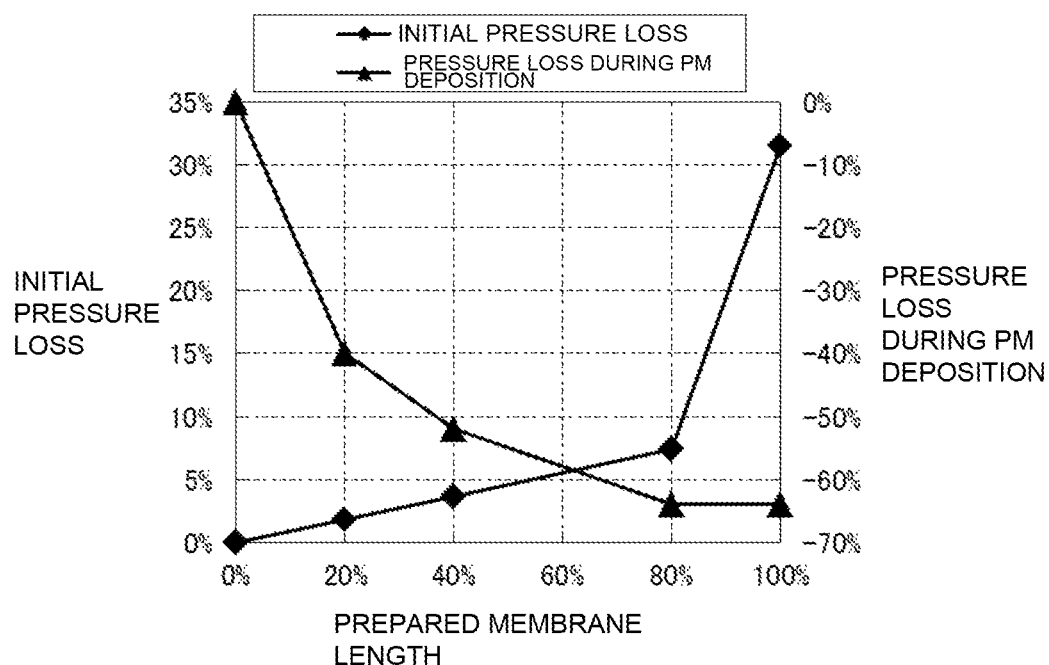
FIG. 12 is a graph showing a relation between a ratio of a prepared membrane length and each of an evaluation of an initial pressure loss as well as an evaluation of a pressure loss during deposition of PM.
Figure 13:
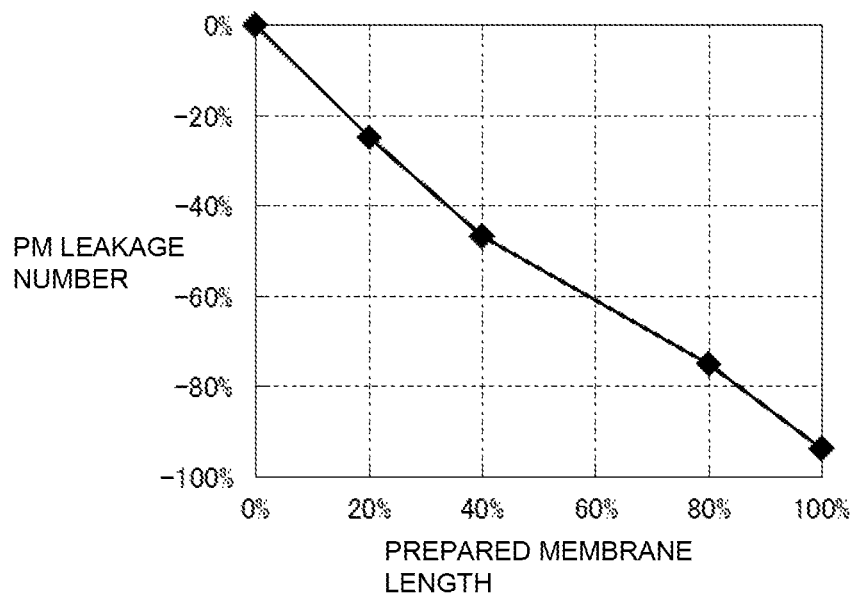
FIG. 13 is a graph showing a relation between the ratio of the prepared membrane length and an evaluation of PM leakage number.

In Example 1, there was confirmed the tendency that the porosity of the trapping layer was high, but since the penetration thickness was large, the initial pressure loss heightened as compared with Example 2. In Example 2, the ratio of the prepared membrane length was 100%, and hence the initial pressure loss was higher than those of Examples 3 to 5. Here, in each of Examples 2 to 5 and Comparative Example 1, a relation between the ratio of the prepared membrane length and each of the evaluation of the initial pressure loss as well as the evaluation of the pressure loss during the PM deposition was shown in a graph. FIG. 12 is a graph showing the relation between the ratio of the prepared membrane length and each of the evaluation of the initial pressure loss as well as the evaluation of the pressure loss during the PM deposition. In the graph shown in FIG. 12, the abscissa indicates the ratio (%) of the prepared membrane length. In Comparative Example 1, the ratio of the prepared membrane length is set to 0%. In Examples 2 to 5, the ratios of the prepared membrane lengths are 100%, 80%, 40% and 20%, respectively. In the graph shown in FIG. 12, the ordinate on the left side indicates the evaluation (%) of the initial pressure loss, and the ordinate on the right side indicates the evaluation (%) of the pressure loss during the PM deposition. In FIG. 12, a series shown by black rhombuses indicates the values of the evaluation results of the initial pressure loss, and a series shown by black triangles indicates the values of the evaluation results of the pressure loss during the PM deposition. Furthermore, in each of Examples 2 to 5 and Comparative Example 1, a relation between the ratio of the prepared membrane length and the evaluation of the PM leakage number was shown in a graph. FIG. 13 is the graph showing the relation between the ratio of the prepared membrane length and the evaluation of the PM leakage number. In the graph shown in FIG. 13, the abscissa indicates the ratio (%) of the prepared membrane length. In the graph shown in FIG. 13, the ordinate shows the evaluation (%) of the PM leakage number.

In Example 3, the ratio of the prepared membrane length was 80%. In Example 4, the ratio of the prepared membrane length was 40%. In Example 5, the ratio of the prepared membrane length was 20%. It is seen from the graph shown in FIG. 12 that each of Examples 3 to 5 has a good balance between the initial pressure loss and the pressure loss during the PM deposition.

In Example 6, the porosity of the trapping layer was comparatively low and the cross section uniformity had a large value. Therefore, Example 6 had a higher initial pressure loss than Example 2. In Example 7, the porosity of the trapping layer was comparatively high. Therefore, Example 7 had a lower initial pressure loss than Example 2. Example 8 indicated a larger value of the cross section uniformity than Example 2. Therefore, Example 8 had a higher initial pressure loss than Example 2.

A plugged honeycomb structure of the present invention can be utilized as an exhaust gas purifying filter to purify an exhaust gas.

DESCRIPTION OF REFERENCE SYMBOLS AND REFERENCE NUMERALS 1 and 31: partition wall base material, 1a: particles forming partition walls, 2 and 32: cell, 2a and 32a: cell (first cell), 2b and 32b: cell (second cell), 3 and 33: circumferential wall, 4 and 34: honeycomb structure body, 5 and 35: plugging portion, 6, 36 and 46: trapping layer, 6a: particles forming the trapping layer, 6x: surface layer, 6y: deep layer, 10, 40 and 50: partition wall, 11 and 41: first end face (end face), 12 and 42: second end face (end face), 37: bonding layer, 38: outer wall (the outer wall of a honeycomb segment), 39: honeycomb segment, 56: $\alpha$-$Al_2O_3$, 57: aluminum titanate, 58: glass, 59: pore, 100, 200 and 300: plugged honeycomb structure, C: central portion (the central portion of one side of the cell), D1 and D2: depth, L: distance (the distance between particles), P: straight line, T1: length (the length of one side of a square), T2: thickness of the trapping layer (the thickness of the trapping layer in the central portion of one side of the cell), X: square, Y: one side of the cell, and $\alpha$, $\beta$ and $\gamma$: straight line.

What is claimed is:

1. A plugged honeycomb structure comprising:
    a pillar-shaped honeycomb structure body having partition walls including a porous partition wall base material defining a plurality of cells which become through channels for a fluid and extending from a first end face to a second end face, and a porous trapping layer disposed on the surface of the partition wall base material; and
    plugging portions disposed in open ends of the predetermined cells in the first end face and open ends of the residual cells in the second end face,
    wherein the partition wall base material is constituted of a porous body including $\alpha$-$Al_2O_3$ as a main phase having a mass ratio of 40 mass % or more and further including aluminum titanate and glass, and
    wherein a mass ratio between the $\alpha$-$Al_2O_3$ and the aluminum titanate in the porous body constituting the partition wall base material is from 70/30 to 90/10.

2. The plugged honeycomb structure according to claim 1, wherein the porous body constituting the partition wall base material includes 5 to 15 mass % of the glass to 100 mass % of a total of the $\alpha$-$Al_2O_3$, the aluminum titanate and the glass.

3. The plugged honeycomb structure according to claim 1, wherein a porosity of the partition wall base material is from 20 to 50%.

4. The plugged honeycomb structure according to claim 1, wherein an average pore diameter of the partition wall base material is from 5 to 50 μm.

5. The plugged honeycomb structure according to claim 1, wherein a heat capacity of a material constituting the partition wall base material at 600° C. is from 4.25 to 4.50 J/K/cm$^3$.

6. The plugged honeycomb structure according to claim 1, wherein an average thermal expansion coefficient of the partition walls at 40 to 800° C. is from 2.5 to 6.0 ppm/K.

7. The plugged honeycomb structure according to claim 1, wherein the trapping layer includes at least one selected from a group consisting of SiC, silica, mullite, spinel, and alumina.

8. The plugged honeycomb structure according to claim 1, wherein a porosity of the trapping layer is from 50 to 80%.

9. The plugged honeycomb structure according to claim 1, wherein an average pore diameter of the trapping layer is from 1 to 10 μm.

10. The plugged honeycomb structure according to claim 1, wherein a membrane thickness of the trapping layer is from 5 to 50 μm.

11. The plugged honeycomb structure according to claim 1,
    wherein a part of the trapping layer penetrates into pores formed in the partition wall base material, and a thickness of the trapping layer penetrating into the pores formed in the partition wall base material is from 0.1 to 20 μm.

12. The plugged honeycomb structure according to claim 1,
    wherein when the first end face of the honeycomb structure body is an end face on an inlet side of the fluid passing through the cells and the second end face of the honeycomb structure body is an end face on an outlet side of the fluid passing through the cells, the trapping layer is disposed in a region of 20 to 80% of a longitudinal direction from the second end face in the longitudinal direction from the first end face toward the second end face of the honeycomb structure body.

13. The plugged honeycomb structure according to claim 1,
    wherein a thickness of a portion of the trapping layer which is positioned in a corner portion of each of the cells is from one to three times as large as a thickness of a portion of the trapping layer which is positioned in a central portion of a side of the cell.

14. The plugged honeycomb structure according to claim 1,
    wherein an exhaust gas purifying catalyst is loaded onto at least one of each surface of the partition walls of the honeycomb structure body and each pore of the partition walls.

15. A manufacturing method of the plugged honeycomb structure according to claim 1, comprising:
    a step of applying slurry including a trapping layer forming ceramic raw material and combustible fine particles dispersed in water to the surface of the partition wall base material in the honeycomb structure body prior to firing.

16. The manufacturing method of the plugged honeycomb structure according to claim 15,
    wherein an average particle diameter of the combustible fine particles is from 0.05 to 0.5 μm.

17. The manufacturing method of the plugged honeycomb structure according to claim 15,
    wherein the combustible fine particles are made of carbon black.

18. The manufacturing method of the plugged honeycomb structure according to claim 15,
    wherein a volume ratio of the trapping layer forming ceramic raw material to the combustible fine particles is from 20/80 to 80/20.

* * * * *